United States Patent [19]

Nimura et al.

[11] Patent Number: 5,067,082
[45] Date of Patent: Nov. 19, 1991

[54] NAVIGATION APPARATUS

[75] Inventors: Mitsuhiro Nimura; Akimasa Nanba; Shoji Yokoyama, all of Anjo, Japan

[73] Assignees: Aisin AW Co., Ltd.; Kabushiki Kaisha Shinsangyokaihatsu, both of Japan

[21] Appl. No.: 408,504
[22] PCT Filed: Dec. 23, 1988
[86] PCT No.: PCT/JP88/01300
 § 371 Date: Aug. 23, 1989
 § 102(e) Date: Aug. 23, 1989
[87] PCT Pub. No.: WO90/01679
 PCT Pub. Date: Feb. 22, 1990

[30] Foreign Application Priority Data
 Aug. 11, 1988 [JP] Japan .................................. 63-202473
 Aug. 11, 1988 [JP] Japan .................................. 63-202475

[51] Int. Cl.5 .............................................. G06F 15/50
[52] U.S. Cl. .................................... 364/449; 364/444; 340/988; 340/995
[58] Field of Search ....................... 364/443, 444, 449; 73/178 R; 340/988, 990, 995

[56]         References Cited
         U.S. PATENT DOCUMENTS

| 4,774,671 | 9/1988 | Itoh et al. ........................ | 364/444 |
| 4,792,907 | 12/1988 | Ikeda et al. ..................... | 364/449 |
| 4,882,689 | 11/1989 | Aoki ................................ | 364/449 |
| 4,882,696 | 11/1989 | Nimura et al. .................. | 364/449 |
| 4,937,753 | 6/1990 | Yamada ........................... | 364/449 |
| 4,939,662 | 7/1990 | Nimura et al. .................. | 364/449 |
| 4,943,925 | 7/1990 | Moroto et al. .................. | 364/449 |

Primary Examiner—Gary Chin
Attorney, Agent, or Firm—Lorusso & Loud

[57]         ABSTRACT

Navigation data (26) are generated by performing course exploration up to a destination using path data (26), which include information relating to intersections and road information, in response to input of the destination. Course guidance to the destination is provided while present-position pursuit (37) is performed. Course guidance at an end-point of a present-position road is outputted using guidance information for travel to a destination at every intersection obtained from the road network data (26) by course exploration. At an intersection, a road in a direction of travel is recognized by the present-position pursuit means (37), present position on this road is kept track of and the end-point intersection of the road is recognized. Recognition of the travelling direction is performed at the end-point intersection of a road between intersections, and guidance to the next end-point intersection is outputted with the road in the travelling direction serving as a present-position road, whereby course guidance is performed repeatedly at every intersection up to the destination. In course exploration, a road in the direction of travel leading to the destination is set with regard to each intersection. Therefore, if an intersection and the road in the travelling direction thereof are recognized, it is possible to provide course guidance from the end-point intersection of the road in the travelling direction to the destination.

6 Claims, 37 Drawing Sheets

| | STEERING ANGLE Sta(i) | | VEHICLE ORIENTATION Ang(i) | | VEHICLE TRAJECTORY (X(I), Y(I)) |
|---|---|---|---|---|---|
| 0 | -4 | 0 | -10 | 0 | (100, 100) |
| 1 | 3 | 1 | 10 | 1 | (99, 105) |
| 2 | 0 | 2 | 0 | | |
| 6 | 5 | 6 | 60 | 6 | (150, 120) |
| 7 | 4 | 7 | 50 | 7 | (155, 125) |

$\widehat{AB}$ = Dup $\widehat{BC}$ = Ddown

INTERSECTION DATA

| INTERSECTION NO. | EXITING ROAD | ENTERING ROAD | EAST LONGITUDE, NORTH LATITUDE | INTERSECTION NAME |
|---|---|---|---|---|
| I | 2 | 1 | (50, 150) | FRONT OF MINAMI ANJO STN. |
| II | 1 | 2 | (10, 100) | MINAMI ANJO STN. |
| III | 6 | 5 | (150, 150) | ASAHI-MACHI |
| IV | 4 | 3 | (100, 100) | AIOI-CHO |
| V | 7 | 8 | (50, 50) | MINAMI-MACHI |
| VI | 13 | 14 | (10, 10) | |
| VII | 10 | 9 | (150, 20) | |

FIG. 16(b)

ROAD DATA

| ROAD NO. | NO. OF ROAD HAVING SAME STARTING POINT | NO. OF NEXT ROAD HAVING SAME END POINT | STARTING POINT | END POINT | NODE SERIES POINTER | LOAD LENGTH |
|---|---|---|---|---|---|---|
| 1 | 11 | 4 | II | I | A000 | 1000 |
| 2 | 3 | 12 | I | II | A0A0 | 1000 |
| 3 | 2 | 6 | I | IV | A0B3 | 2000 |
| 4 | 5 | 1 | IV | I | A0C0 | 2000 |
| 5 | 8 | 5 | IV | III | A0DE | 1500 |
| 6 | 6 | 7 | III | IV | A101 | 1500 |
| 7 | 12 | 10 | V | IV | A201 | 800 |
| 8 | 9 | 11 | IV | V | A221 | 800 |
| 9 | 4 | 9 | IV | VII | A253 | |
| 10 | 10 | 3 | VII | IV | A260 | |
| 11 | 1 | 13 | I | V | A265 | |
| 12 | 14 | 2 | V | II | A28B | |
| 13 | 13 | 11 | VI | V | A2A0 | |
| 14 | 7 | 14 | V | VI | A2B0 | |

FIG. 16(c)

NODE SERIES DATA

A000 — 15 ← NUMBER OF NODES (EAST LONGITUDE, NORTH LATITUDE)

DESTINATION INPUT

GUIDANCE OUTPUT

TRAVELLING-DIRECTION DATA

| INTERSECTION NO. | ROAD TO BE TRAVELLED ON |
|---|---|
| I | 0 |
| II | 1 |
| III | 6 |
| IV | 4 |
| V | 12 |
| VI | 13 |
| VII | 10 |

NAVIGATION APPARATUS

TECHNICAL FIELD

This invention relates to a navigation apparatus which, by being provided with an input of a desired destination, performs course explorations up to the destination to furnish a course to the destination while keeping track of present position.

BACKGROUND ART

A navigation apparatus provides course guidance for travel to a destination to a driver who is unfamiliar with the local geography. Recent years have seen extensive development of such navigation apparatus.

The conventional navigation apparatus is adapted to set a course from a point of departure to a desired destination by being provided with an input of point of departure and destination prior to travel, and to perform navigation in accordance with the course set. In a case where a course is designated, navigation is such that a map is displayed on the screen of a CRT and the course is superimposed on the map. In some apparatus, distance to an intersection at which a turn is to be made next is displayed numerically, in the form of a graph or as a characteristic photograph as information relating to the intersection at which the next turn is to be made in accordance with the preset course. A voice-track output is also used in some apparatus.

However, with the conventional navigation apparatus, a course is set from a departure point to a destination and course guidance is provided to the driver in accordance with the course set, as mentioned above. Consequently, a problem is that if the driver should happen to mistake, say, an intersection and stray from the course, travel in accordance with the guidance provided by the navigation apparatus will not be able to continue unless the vehicle is returned to the set course or a course is set anew with the prevailing position serving as the point of departure. However, both returning to the set course and setting a course with the prevailing position as the departure point place a great load upon the driver. In other words, the fact that course guidance is required means that the driver is not familiar with the road conditions in the region. If the driver loses his or her way in such an unfamiliar region, it will be difficult to ascertain what the present position is, even though the departure point and destination may be known.

Furthermore, a decision as to whether or not a predetermined intersection has been passed as specified by the course guidance is premised upon detection of travelled distance or a left or right turn as detected by a distance sensor or steering angle sensor, respectively. In actuality, however, detection errors occur and can accumulate and cause errors in judgment. With the conventional navigation apparatus, course from departure point to destination is set and travelling distance is added up while left and right turns are detected in accordance with the course. Consequently, distance errors are also added up until a correction can no longer be applied. Furthermore, only present position on a course can be specified. If an angle on a branch road having only small angular differences lies within an allowable error, a decision to the effect that the vehicle is travelling correctly will be made based solely on this meager information. As a result, judgment errors are likely to occur.

An object of the present invention is to enable present position to be calculated reliably at every intersection at any geographical point without a course being fixed. Another object of the present invention is to enable appropriate guidance information to be outputted at any geographical point. A further object of the present invention is to enable present position to be recognized at an intersection and to correct distance errors.

DISCLOSURE OF THE INVENTION

To these ends, the present invention provides a navigation apparatus which, by being provided with an input of a destination, performs course exploration up to the destination to furnish a course to the destination while keeping track of present position, characterized by having road network data which include road information between intersections, road recognition means for recognizing a road in a travelling direction at an intersection, and present-position recognition means for keeping track of present position on a road recognized by the road recognition means and recognizing an end-point intersection of the road, wherein intersection recognition processing is performed on the condition that a predetermined range has been penetrated from the end-point intersection based on the road network data, whereby a road in a travelling direction is recognized. Travelling direction is recognized at the end-point intersection of the road between intersections, and guidance to the next end-point intersection is outputted with the road in the travelling direction serving as a present-position road, whereby course guidance is performed repeatedly at every intersection up to the destination. Therefore, as the road network data, there are provided intersection data having information relating to end-point and starting-point roads and position at least for every intersection, road data having information relating to starting-point and end-point intersections and node series pointers for every road, and node series data having position information relating to nodes forming a road, wherein travelling-direction information for travel to the destination is set at each intersection by inputting the destination, thereby providing course guidance.

Further, the apparatus is characterized by having road network data which includes road network information having intersections as reference points, steering-angle detecting means, distance detecting means, computing means for computing vehicle orientation and trajectory from steering angle and travelling distance, turning-point detecting means for detecting a turning point from steering angle and vehicle orientation and computing the position of the turning point, and road selecting means for computing vehicle turning angle from the turning-point position, computing, from the road network data, turning angle of a road leading to an intersection, and selecting a road in a travelling direction, wherein an angle is computed based on three points, namely the turning-point position and points on both sides thereof, and present position is calculated based on an incoming road and intersection information.

In accordance with the present invention, a turning point is detected and the position thereof computed by the turning point detecting means, and the vehicle turning angle and the turning angle of the connecting road are computed by the road selecting means, whereby a road in the direction of travel can be selected. Moreover, since present position is computed using turning points as a reference, a distance correction can be made with ease based on turning point, and errors in data can be absorbed at every intersection. In addition, in conformity with travelling conditions at the time of a turn, angle is detected based on three points, namely turn starting point, turn end point and turning point. Accordingly, regardless of whether a wide turn or narrow turn is made at the same intersection, angle detection can be performed without being affected.

Further, intersection recognition processing is performed on the condition that a predetermined range has been penetrated from the end-point intersection based on the road network data, the road in the travelling direction is recognized and guidance to the next endpoint intersection is outputted using this road as the present-position road. As a result, information for guidance to the destination is obtained from any intersection whatsoever. Accordingly, even if a road different from a guided course is selected to be the travelling direction, guidance for travel to the destination at the end-point intersection of this road can be outputted. Therefore, even if an intersection is passed through without obeying the optimum course because of a traffic tie-up or the like, guidance to the destination will be obtained.

BRIEF DESCRIPTION OF THE DRAWINGS

FIGS. 16(a)-16(d) are the views showing a road network and an example of the data structure of intersection data, road data and node series data;

BEST MODE FOR CARRYING OUT THE INVENTION

Figure 1:
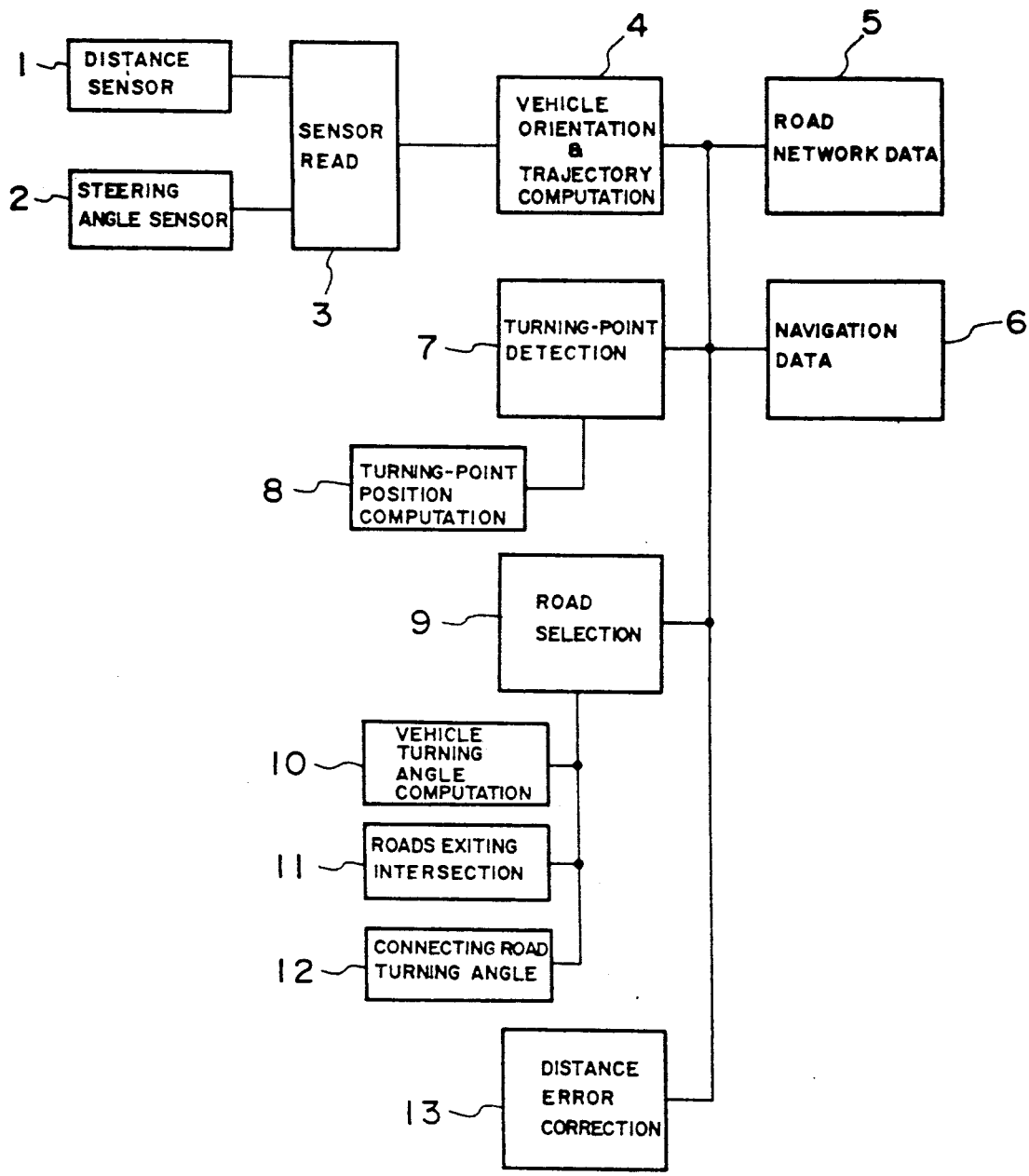
FIG. 1 is a view of a system arrangement for describing an embodiment of present position calculation in a navigation apparatus according to the present invention.
Figure 2A:
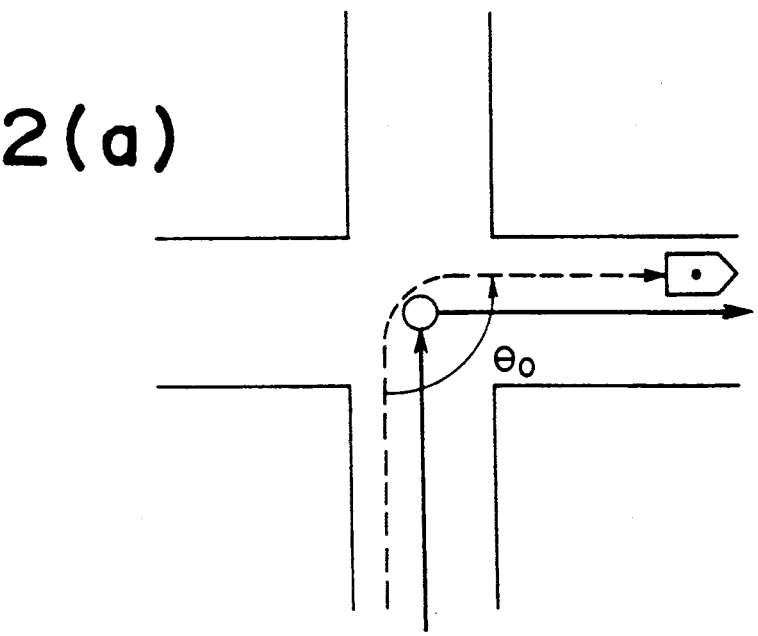
FIGS. 2(a)-2(b) are the views for describing selection of a road in a travelling direction.
Figure 2B:
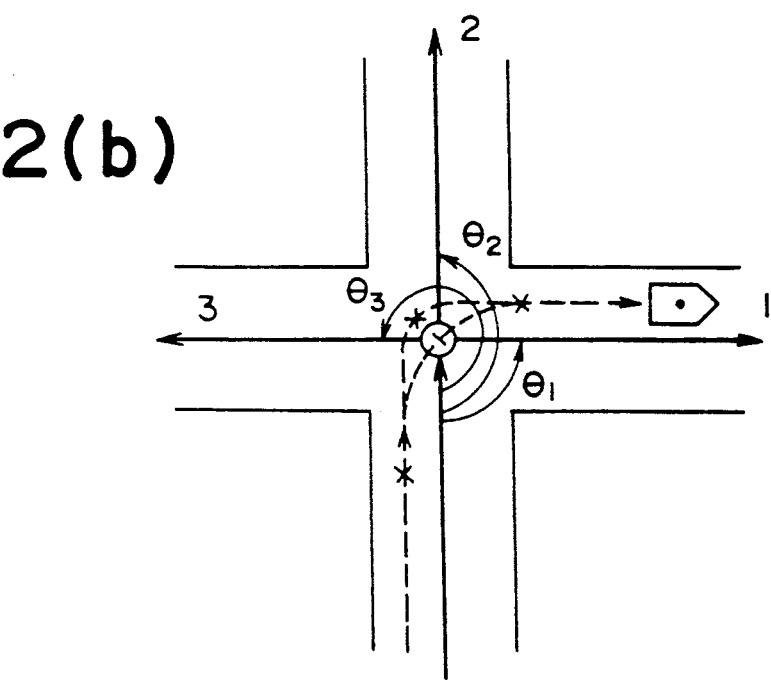

In FIG. 1, a distance sensor ① senses the distance traveled by a vehicle, a steering angle sensor ② senses the steering angle of the steered vehicle, and a sensor read-in unit ③ performs processing for reading in these detection signals. A vehicle orientation and trajectory computing unit ④ computes vehicle orientation and trajectory from the steering angle whenever the vehicle travels a fixed distance. Road network data ⑤ comprise data indicative of intersection information, roads connecting intersections and node series forming roads. Navigation data ⑥ comprise course guidance information, set course information and other data required for navigation. A turning point detector ⑦ performs turning point recognition processing and has a turning point position computing unit ⑧ under its command. The latter computes turning point position corresponding to an intersection position by detecting the starting and end points of a turn in the error range of an intersection. A road selector ⑨ has under its command a vehicle turning angle computing unit ⑩, a read-in unit ⑪ for reading in a road exiting and intersection, and a connecting-road turning angle computing unit ⑫. The road selector ⑨ without relation to whether a guided road in the traveling direction has been selected or not, compares the actual turning angle of a vehicle and a connecting-road turning angle obtained from road network data, thereby selecting a road which passes through an intersection. A distance error correcting unit (13) corrects a distance error based on the detected turning point position and the selected road in the travelling direction, and determines the present position on the road in the traveling direction. That is, the unit (13) determines the distance remaining to be travelled up to the end-point intersection on the present-position road. With the foregoing arrangement, the present invention computes a turning angle $\theta_0$ at the moment a turn ends in a case where a vehicle follows a course calling for a right turn at an intersection, as shown in FIG. 2(a), and computes turning angles $\theta_1$, $\theta_2$, $\theta_3$ regarding all exiting roads (connecting roads) (1), (2), (3) with respect to a road entering the intersection, as shown in FIG. 2(b). By comparing these angles, the nearest road in the travelling direction which falls within an allowable error is selected.

A specific example of the processing executed by each of the foregoing units will now be described.

Figure 3:
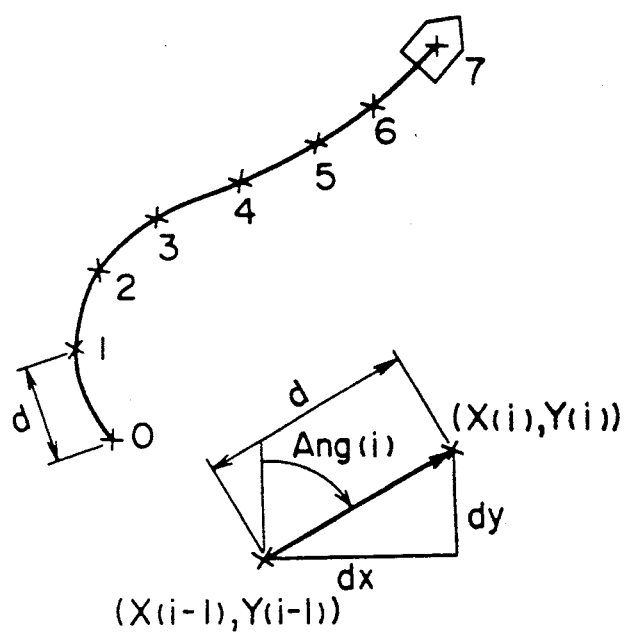
FIG. 3 is a view for describing processing for computing vehicle orientation and trajectory.

As shown in FIG. 3, the vehicle orientation and trajectory computing unit (4) samples traveling distance and steering angle Sta whenever the vehicle travels a fixed distance d, computes a new vehicle orientation and trajectory from the preceding vehicle orientation Ang and trajectory (X,Y), and preserves these in memory. For example, vehicle orientation Ang(i) can be determined, in accordance with the following equation, from steering angle Sta(i) read in from the sensor every fixed distance and vehicle rotation angle $\theta$(st) with respect to a previously stored steering angle:

$$Ang(i) = \theta[sta(i)] + Ang(i-1)$$

and vehicle trajectory [X(i), Y(i)] can be determined using the following equations:

$$[X(i), Y(i)] = [X(i-1)+dx, Y(i-1)+dy]$$

$$dx = d \times \cos[\pi - Ang(i)]$$

$$dy = d \times \sin[\pi - Ang(i)]$$

Figure 4:
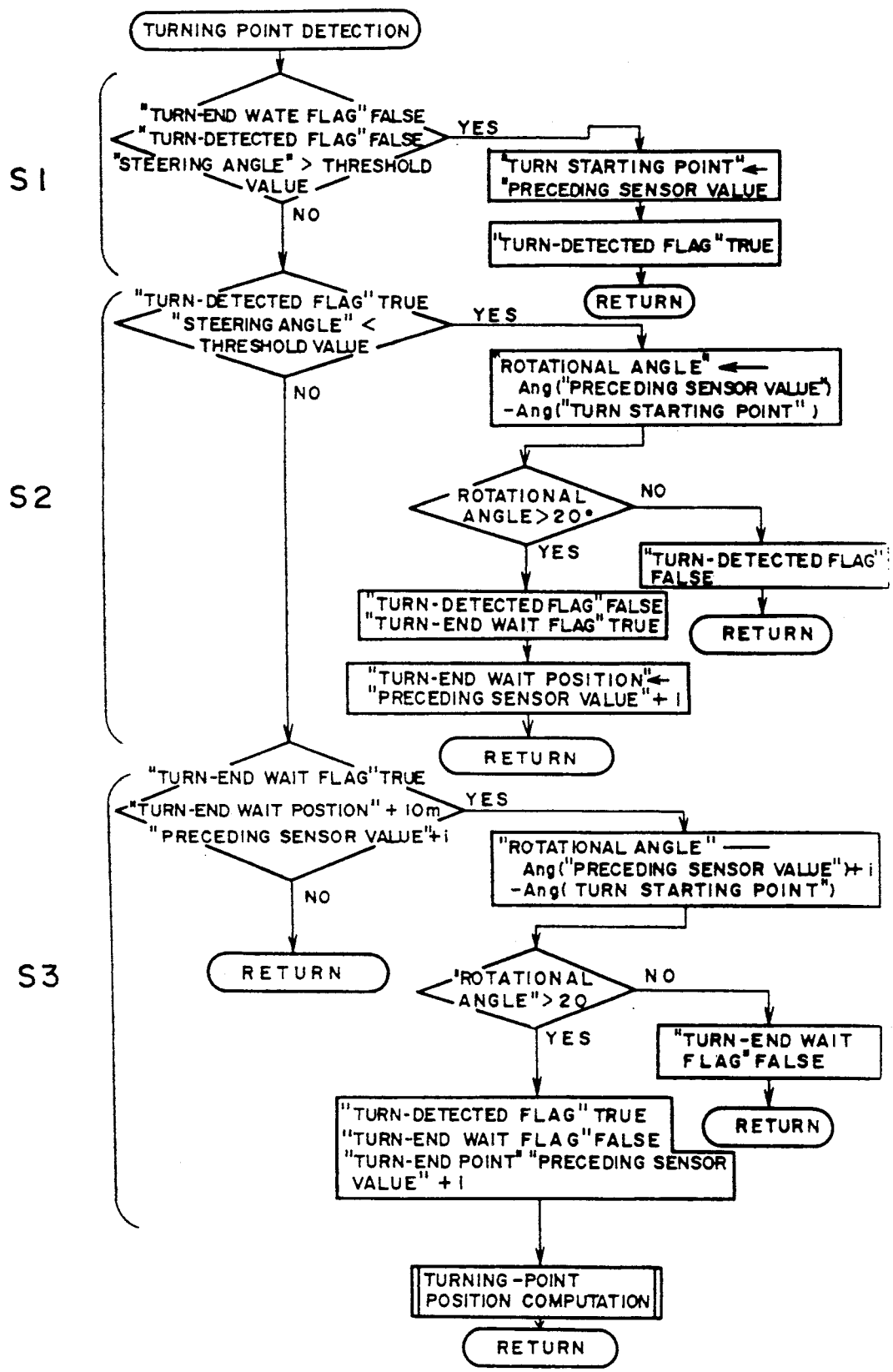
FIG. 4 is a view showing an example of a processing routine for detecting a turning point.

As shown in FIG. 4, turning point detector (7) performs the following processing:

(S1) First, it is determined whether a "TURN-END WAIT FLAG" and a "TURN-DETECTED FLAG" are off and steering angle is greater than a threshold value. If the answer is "YES" (turn has begun), then "TURN STARTING POINT" is set to the present distance ("PRECEDING DISTANCE SENSOR VALUE"+i) and the "TURN-DETECTED FLAG" is turned on. In other words, since the steering angle here exceeds the threshold value for the first time, a transition is made to the turn detection processing state. However, if the answer is NO (i.g., a so-called linear travelling state in which a turn is in the process of being detected or the steering angle is less than the threshold value), then (S2) it is determined whether the "TURN-DETECTED FLAG" is on and the steering angle is less than the threshold value. If the answer is "YES" (meaning that a turn has previously been detected and that the turn has been made), the rotational angle is set to the difference between the present orientation and the orientation at the starting point of the turn. It is then determined whether the rotational angle is greater than 20°. If the rotational angle is less than 20°, it cannot be judged that the intersection has been turned and therefore the "TURN-DETECTED FLAG" is returned to the off state. However, if the rotational angle is greater than 20°, it can be judged that the intersection has been turned and therefore the "TURN-DETECTED FLAG" is returned off, the "TURN-END WAIT FLAG" is turned on and "TURN-END WAIT POSITION" is set to the present distance. This is used in computing the position of the turning point. If the answer is "NO" (meaning that the turn has ended, the turn is already in the process of being detected or the vehicle is travelling linearly), then (S3) it is determined whether the "TURN-END WAIT FLAG" is on and ("TURN-END WAIT POSITION"+10 m) is smaller than the present distance. If the answer is YES (meaning that the vehicle has travelled 10 m from the end of the turn), then the rotational angle is made the difference between the present orientation and the starting point of the turn. It is then determined whether the rotational angle is greater than 20°. If the rotational angle is less than 20°, the "TURN-END WAIT FLAG" is turned off. If the rotational angle is greater than 20°, however, the "TURN-END DETECTED FLAG" is turned on, the "TURN-END WAIT FLAG" is turned off, "TURN END POINT" is set to the present position and turning point position computation is performed.

Figure 5:
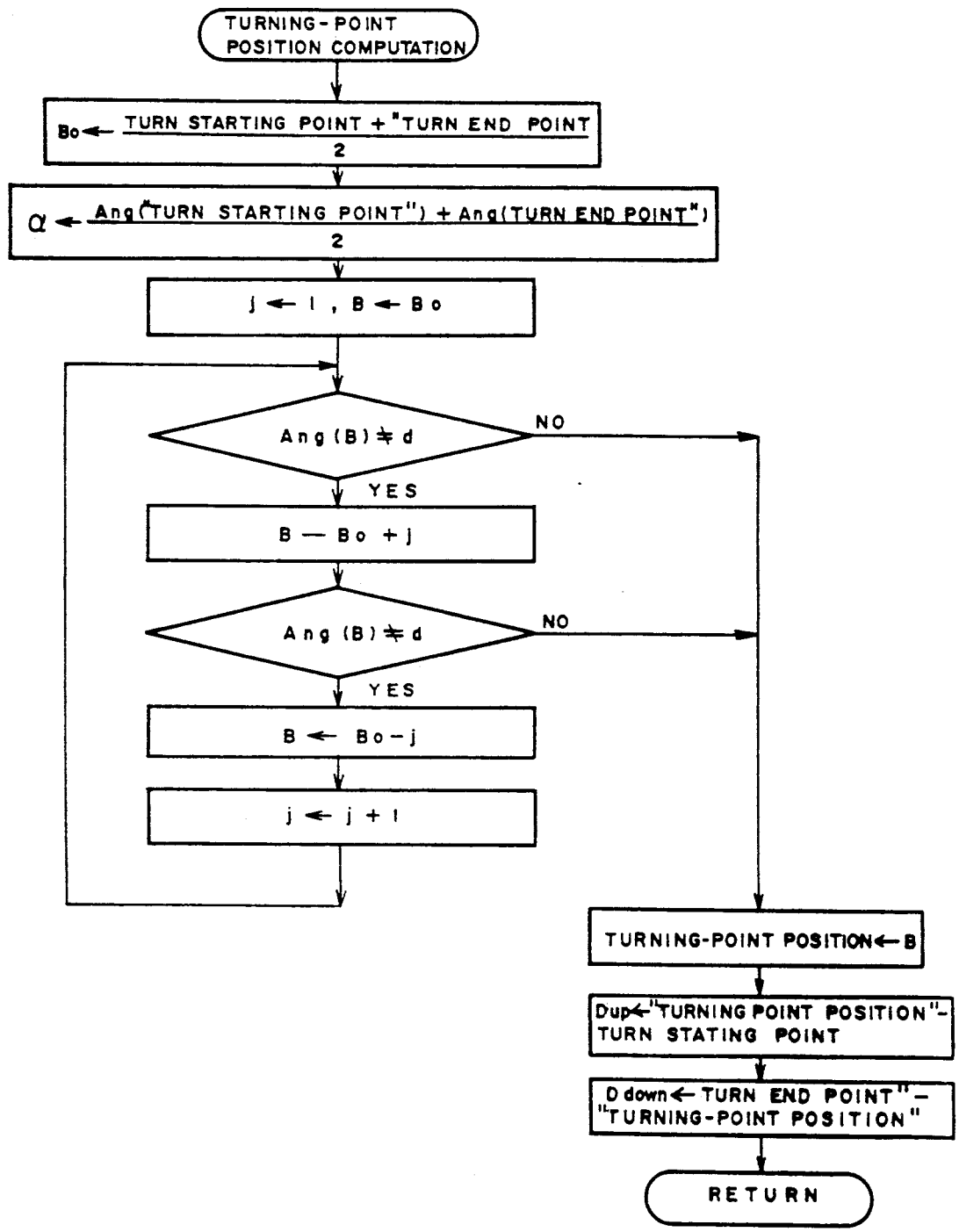
FIG. 5 is a view showing an example of a processing routine for computing the position of a turn.
Figure 8A:
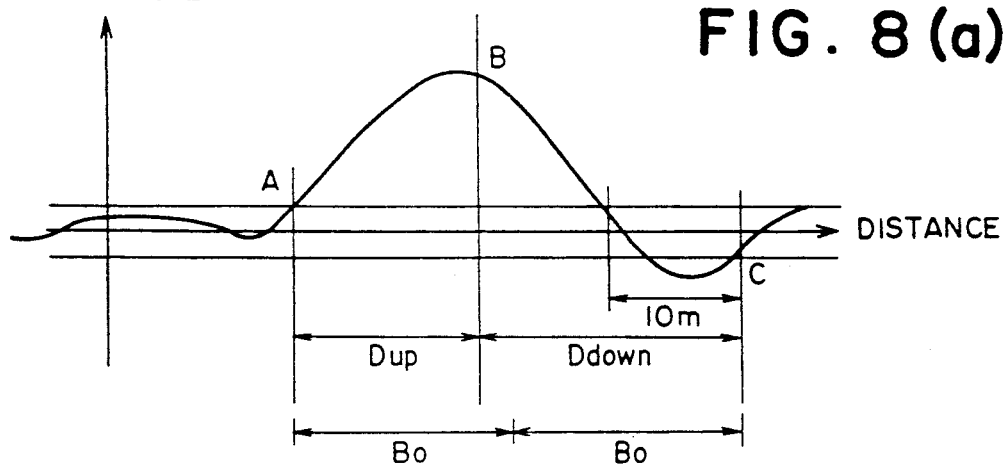
FIGS. 8(a)-8(b) are the views showing steering angle and turn starting point, turning point position and turn end point.
Figure 8B:
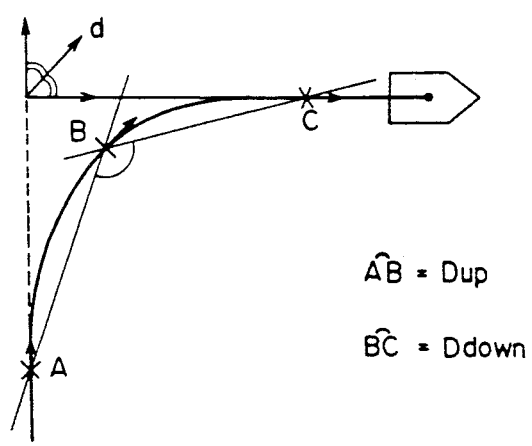

In the foregoing processing, computation of turning point position is computed by the turning point position computing unit (8). As shown in FIG. 5, this entails finding an intermediate distance $B_0$ between turn starting point A and turn end point C as well as an intermediate orientation d of vehicle orientation Ang, setting a loop counter j to 1 and B to a mean distance $B_0$, searching for a point which coincides with the intermediate orientation d with regard to the vehicle orientation Ang(B) at the distance B and the vehicle orientation Ang(B) in a case where $B_0 \pm j$ is set to B while incrementing the loop counter j, and setting the coincidence point B to the position of the turning point. Next, the distance $D_{up}$ from the turn starting point A to the turning point position B, and the distance $D_{down}$ from the turning point position B to the turn end point C are obtained. These relationships are shown in FIG. 8. With regard to the curve starting point A and curve end point C, as shown in FIG. 8(a), when the steering angle exceeds a threshold value, this point is set as the turn starting point A; when the steering angle returns to the threshold value, this point is set as a turn end-wait position C'; when the vehicle has travelled 10 m beyond this point, this point is set as the turn end point C.

Figure 6:
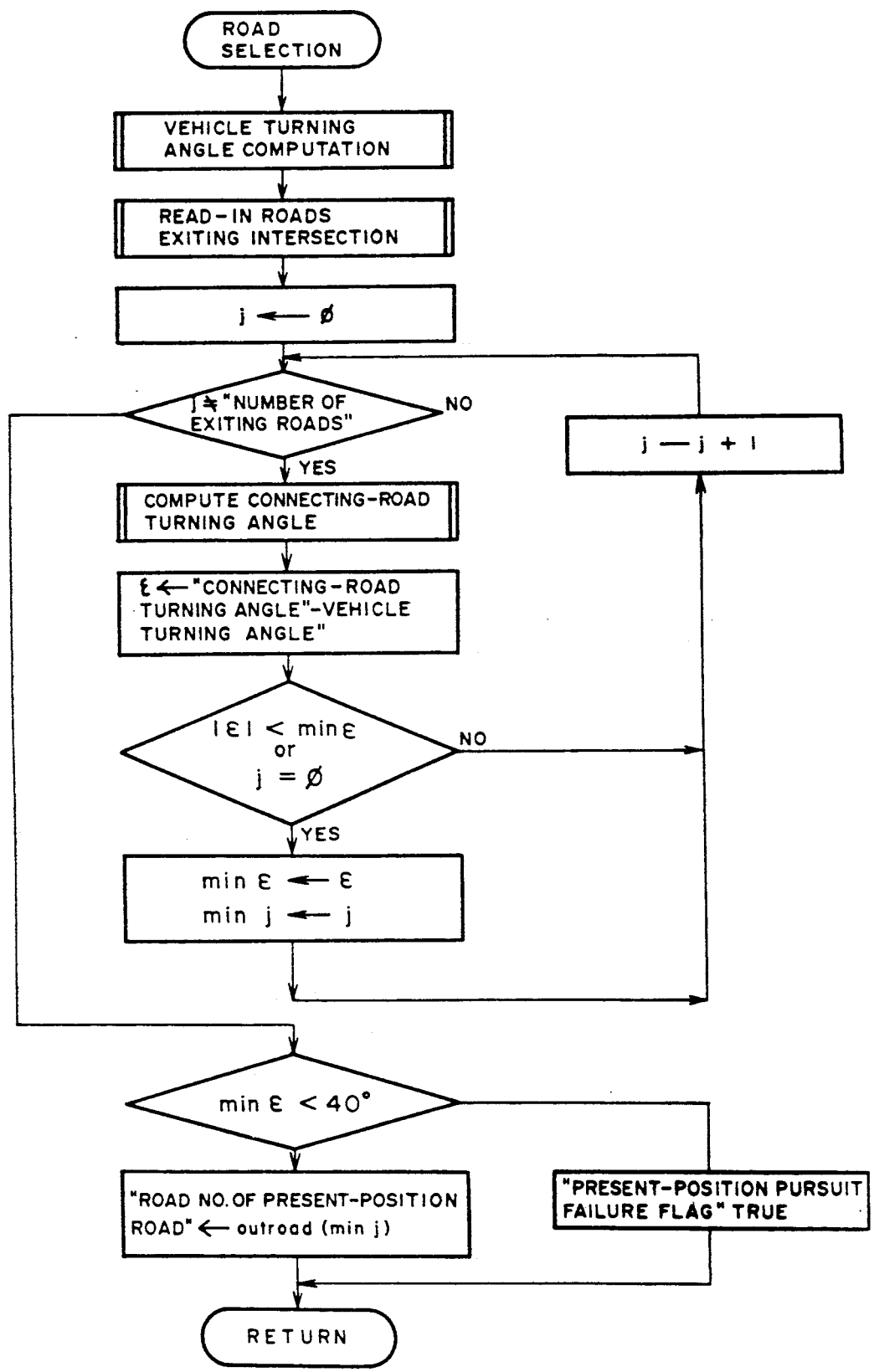
FIG. 6 is a view showing an example of a processing routine for selecting a road.

As shown in FIG. 6, the road selector (9) first computes the turning angle of the vehicle. The road selector then reads in roads exiting an intersection, computes the turning angle of each connecting road and determines the minimum value of the difference between connecting road turning angle and vehicle turning angle. If the minimum value is less than 40°, the road number is set to "ROAD NO. OF PRESENT-POSITION ROAD". If the minimum value is greater than 40°, it is judged that the pertinent road has not been detected and a "PRESENT-POSITION PURSUIT FAILURE FLAG" is turned on. Specifically, in a case where a road nearest the turning angle of the vehicle is selected as the road in the travelling direction, with all connecting roads being investigated, but the intervening error is too large, the present position is set again on the grounds that the present position cannot be calculated.

Figure 7:
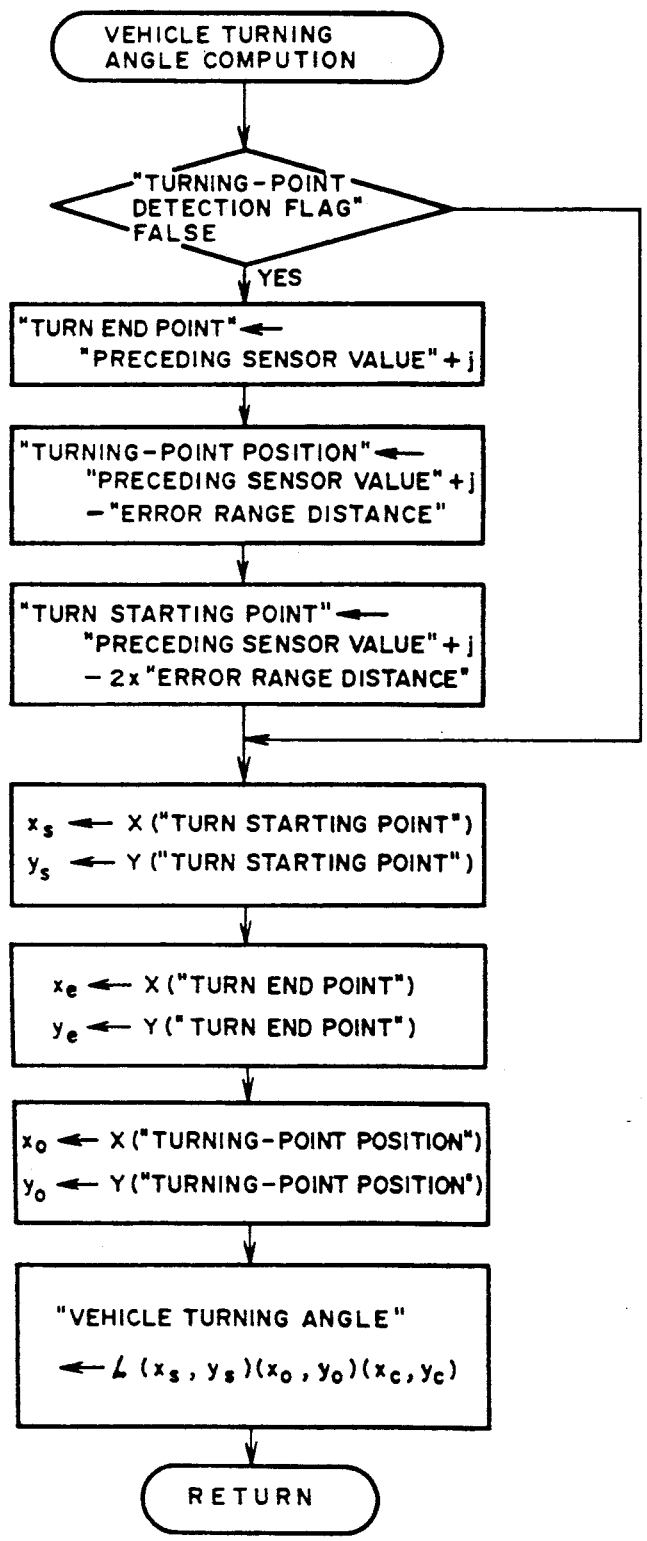
FIG. 7 is a view showing an example of a processing routine for computing vehicle turning angle.

As shown in FIG. 7, the vehicle turning angle computing unit 10 checks to see whether a "TURNING POINT DETECTION FLAG" is off. If this flag is on, the point at which the turn ends, the position of the turning point and the point at which the turn starts are obtained by turning point detection processing (FIG. 4). If the flag is off, however, these values are not obtained and, hence, the following values are set. Specifically, present position ("PRECEDING DISTANCE SENSOR VALUE"+i) is adopted as the turn end point, a value obtained by subtracting an intersection error range distance from present distance is adopted as turning point position, and a value obtained by subtracting twice the intersection error range distance from present distance is adopted as turn starting point. An angle ∠ABC shown in FIG. 8 is obtained as the vehicle turning angle based on the coordinates of these three points.

Figure 9:
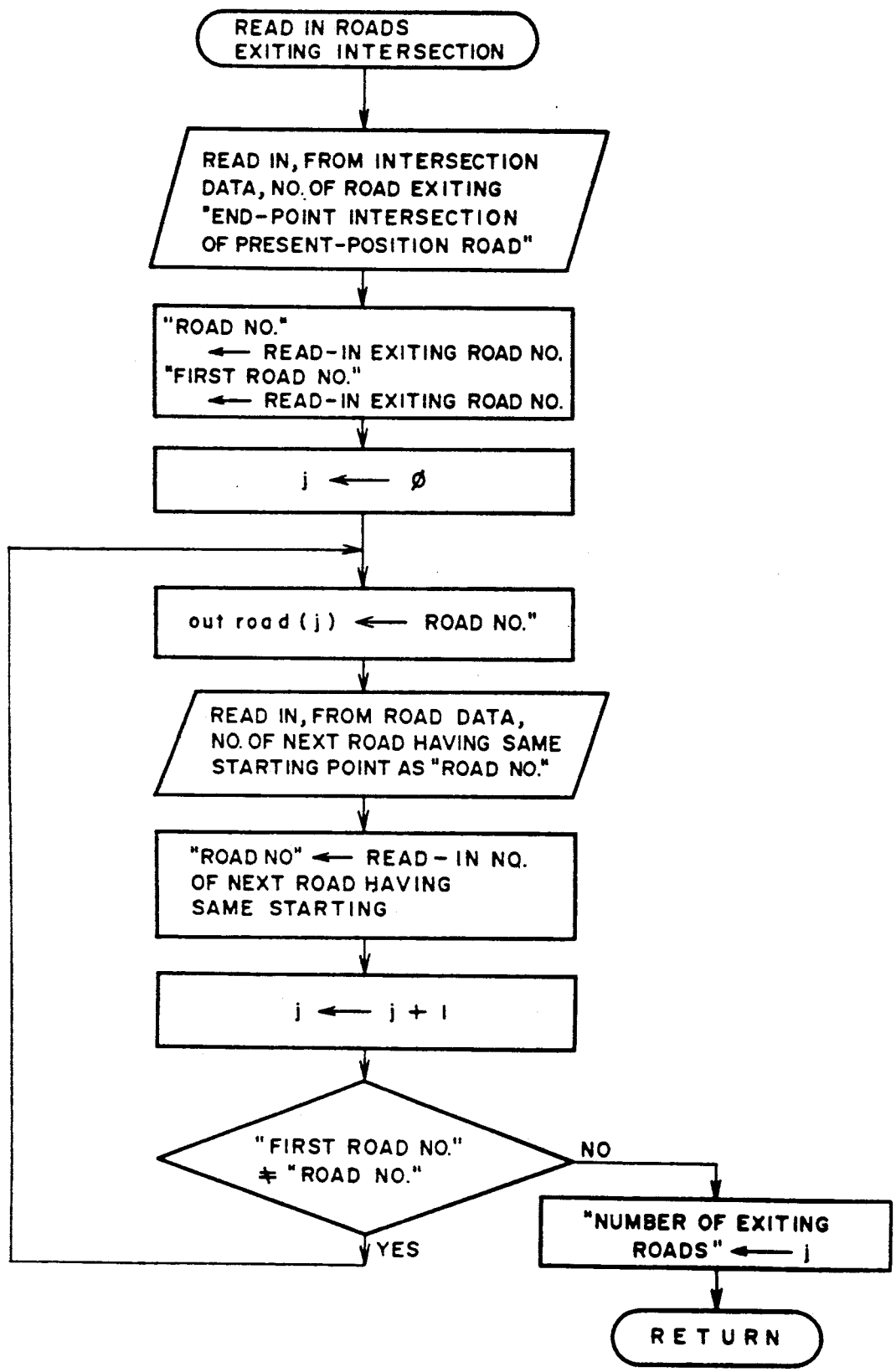
FIG. 9 is a view showing an example of a processing routine for reading in a road exiting an intersection.

When computation of the vehicle turning angle ends, the unit 11 for reading in the roads exiting the intersection operates next. As shown in FIG. 9, this processing entails reading in, from the intersection data, the numbers of roads exiting the end-point intersection of the persent-position road and setting these road numbers to "ROAD NO." and "INITIAL ROAD NO.", respectively. A loop counter j is set to 0. Next, while the loop counter j is incremented, the next road numbers of roads having the same starting point are successively read out from the road data until the "INITIAL ROAD NO." is attained, whereby all road numbers are read out and the number thereof is set to "NUMBER OF EXITING ROADS".

Figure 10:
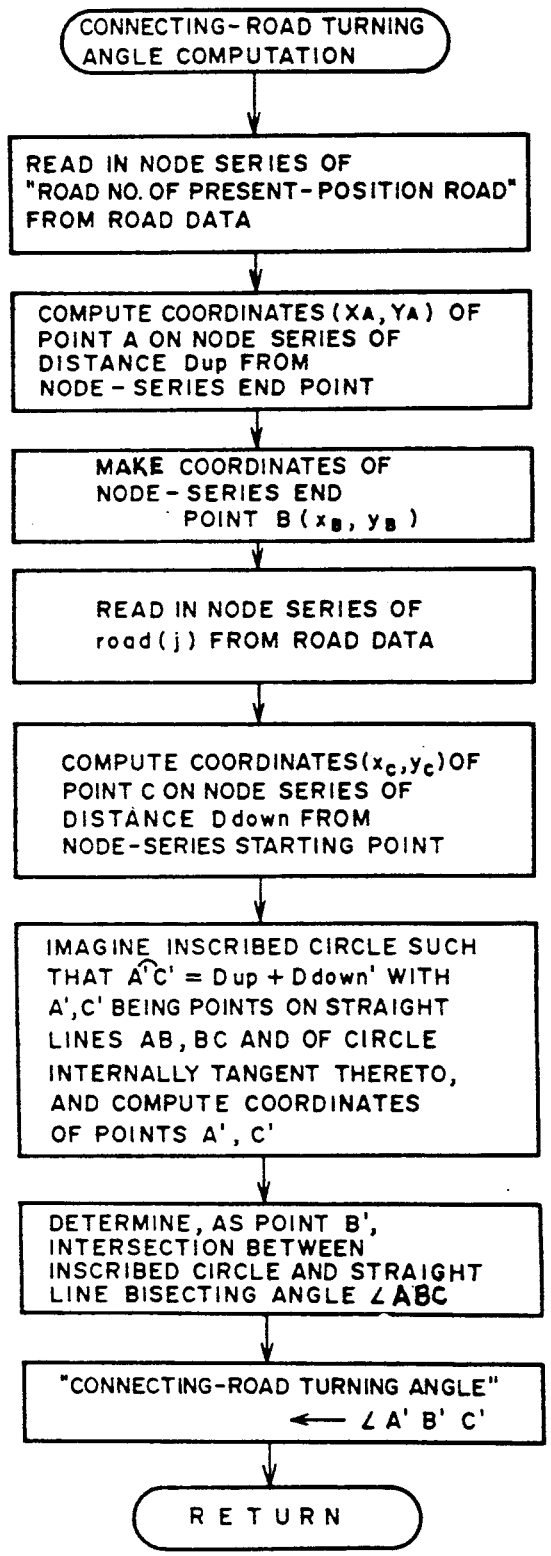
FIG. 10 is a view showing an example of a processing routine for computing the turning angle of a connecting road.
Figure 11:
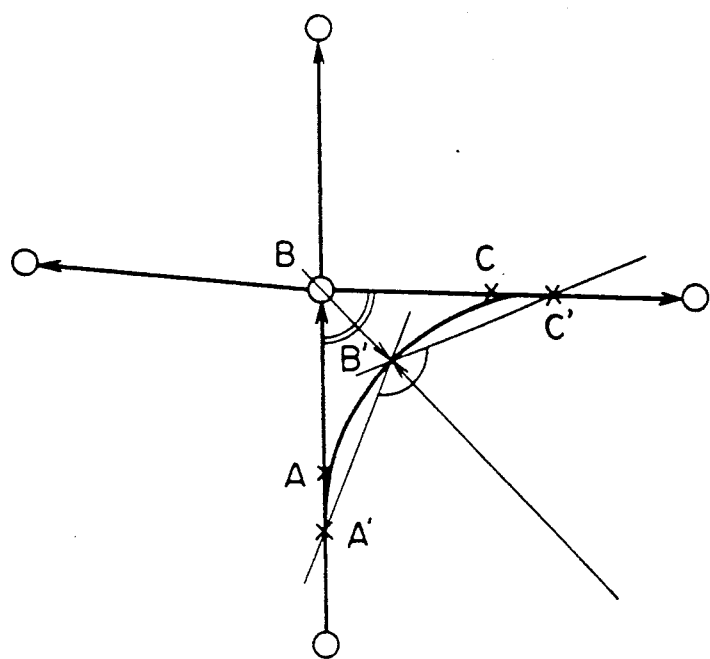
FIG. 11 is a view for describing a method of determining the turning angle of a connecting road.

As shown in FIG. 10, the connecting road turning angle computing unit 12, which performs the connecting road turning angle computation in road selection (FIG. 6), reads in a node series of the road number of the present-position road from the road data and node series data and computes coordinates $(X_A, Y_A)$ of point A a distance $D_{UP}$ from this end point. The end point B of the node series is adopted as the coordinates $(X_A, Y_A)$. Next, the node series of roads exiting the intersection is read in from the road data and node series data and coordinates $(X_A, Y_A)$ of point C a distance $D_{DOWN}$ from this starting point are computed. Further, an inscribed circle is imagined from these coordinates such that the length of an arc (A'C') becomes $D_{UP}+D_{DOWN}$, with A', C' being points on straight lines AB, BC and on a circle internally tangent to these straight lines, the coordinates of the points A', C' are computed, and the point of intersection between this inscribed circle and a straight line bisecting the angle ∠ABC is obtained as point B'. An angle ∠A'B'C' obtained as a result is set to "CONNECTING ROAD TURNING ANGLE". These relationships are shown in FIG. 11.

Figure 12:
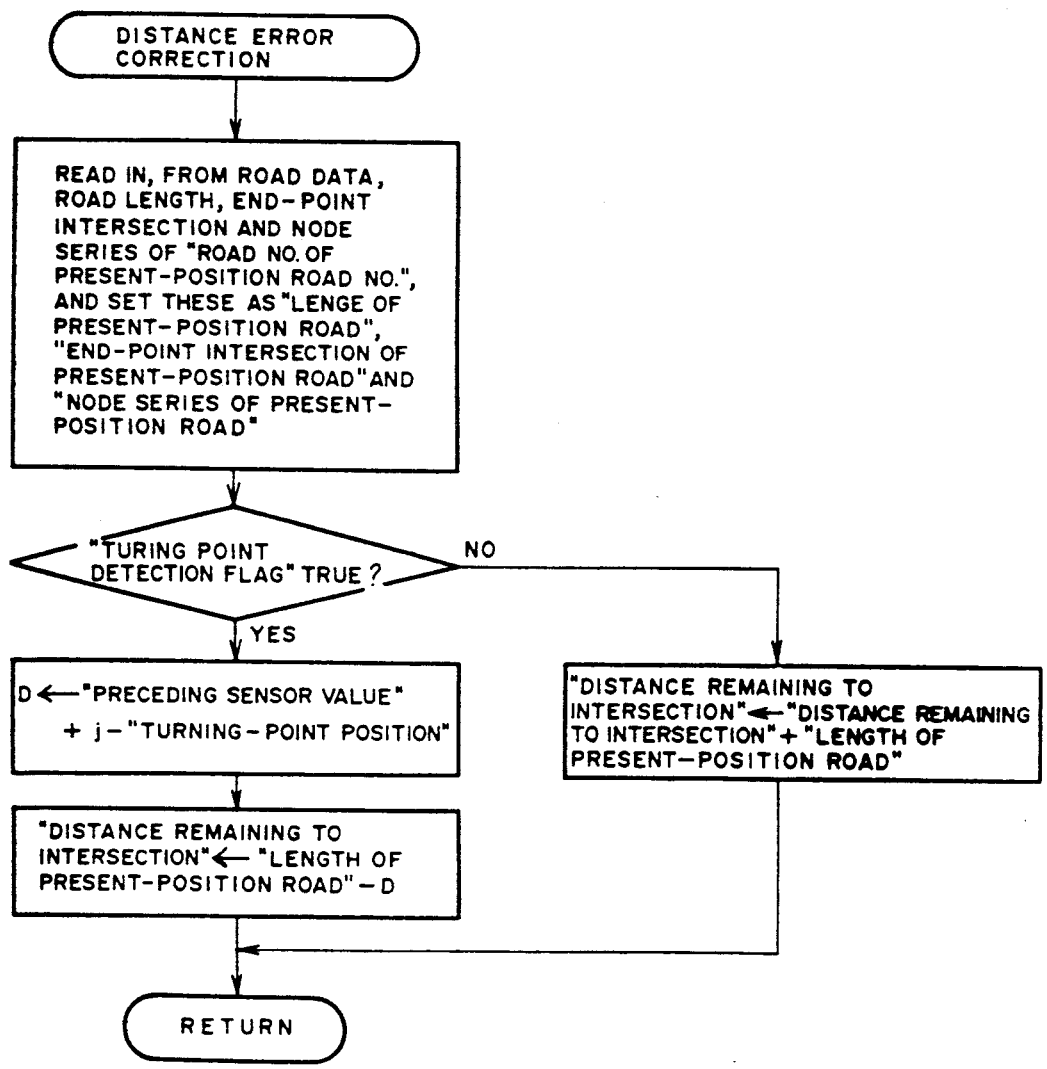
FIG. 12 is a view showing an example of a processing routine for correcting a distance error.
Figure 13A:
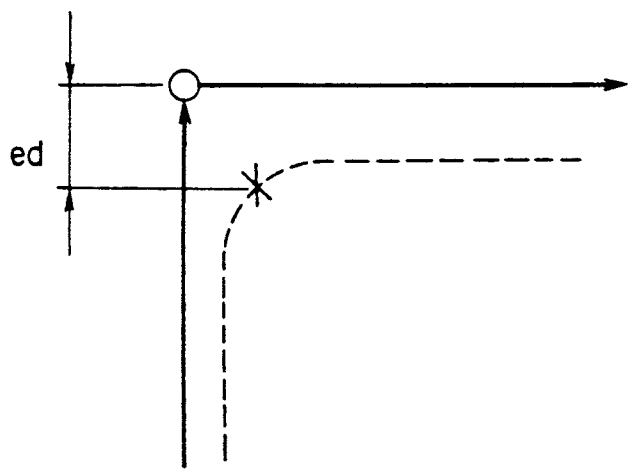
FIGS. 13(a)-13(b) are the views for describing the contents of processing for correction a distance error.
Figure 13B:
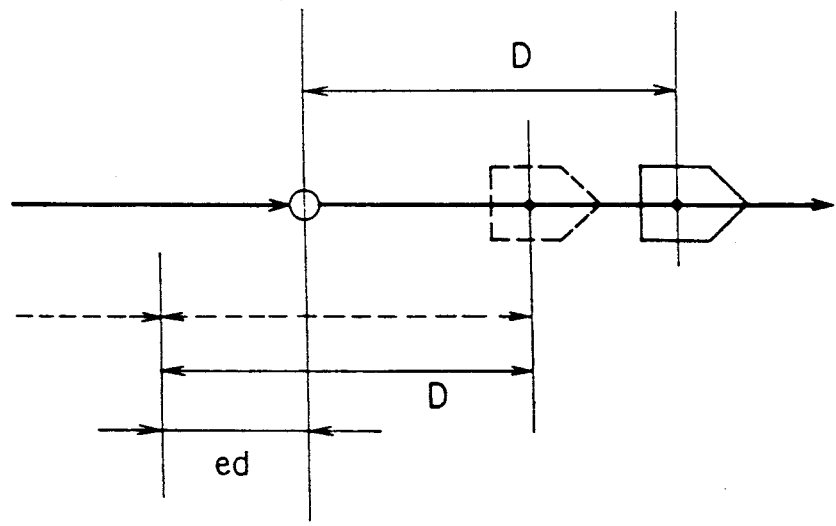

As shown in FIG. 12, the distance error correction 13 entails reading in, from the road data and node series data, road length, end-point intersection and a node series in accordance with "ROAD NO. OF PRESENT-POSITION ROAD", in a manner similar to the setting of initial position, and setting these as "LENGTH OF PRESENT-POSITION ROAD", "END-POINT INTERSECTION OF PRESENT-POSITION ROAD" and "NODE SERIES OF PRESENT-POSITION ROAD". This is followed by checking to see whether "TURNING POINT DETECTION FLAG" is on, determining the difference D between present distance ("PRECEDING DISTANCE SENSOR VALUE"+i) and the position of the turning point, subtracting the value D from "LENGTH OF PRESENT-POSITION ROAD" and setting the result as "DISTANCE REMAINING TO INTERSECTION". In other words, the processing executed here is such that by making a turn at an intersection and entering the next road, the error up to that point is corrected for the new road by length. However, if "TURNING POINT DETECTION FLAG" is off, a new value obtained by adding "LENGTH OF PRESENT-POSITION ROAD" to "DISTANCE REMAINING TO INTERSECTION" is updated as a new "DISTANCE REMAINING TO INTERSECTION". This is processing corresponding to a case where the vehicle passes through the intersection without turning. For example, if "DISTANCE REMAINING TO INTERSECTION" is 0 at the intersection, then "LENGTH OF PRESENT-POSITION ROAD" is set as is as a new "DISTANCE REMAINING TO INTERSECTION". FIG. 13 illustrates the result of error correction in a case where turning point is and is not detected. As shown in (a) of FIG. 13, let ed represent the distance error between the turning point position and the intersection position. In such case, correction of D is carried out with respect to distance remaining to the next intersection, with the turning point position serving as the intersection position, as shown in (b) of FIG. 13.

An example of the system arrangement of a navigation apparatus having a present-position calculating function will now be described.

Figure 14:
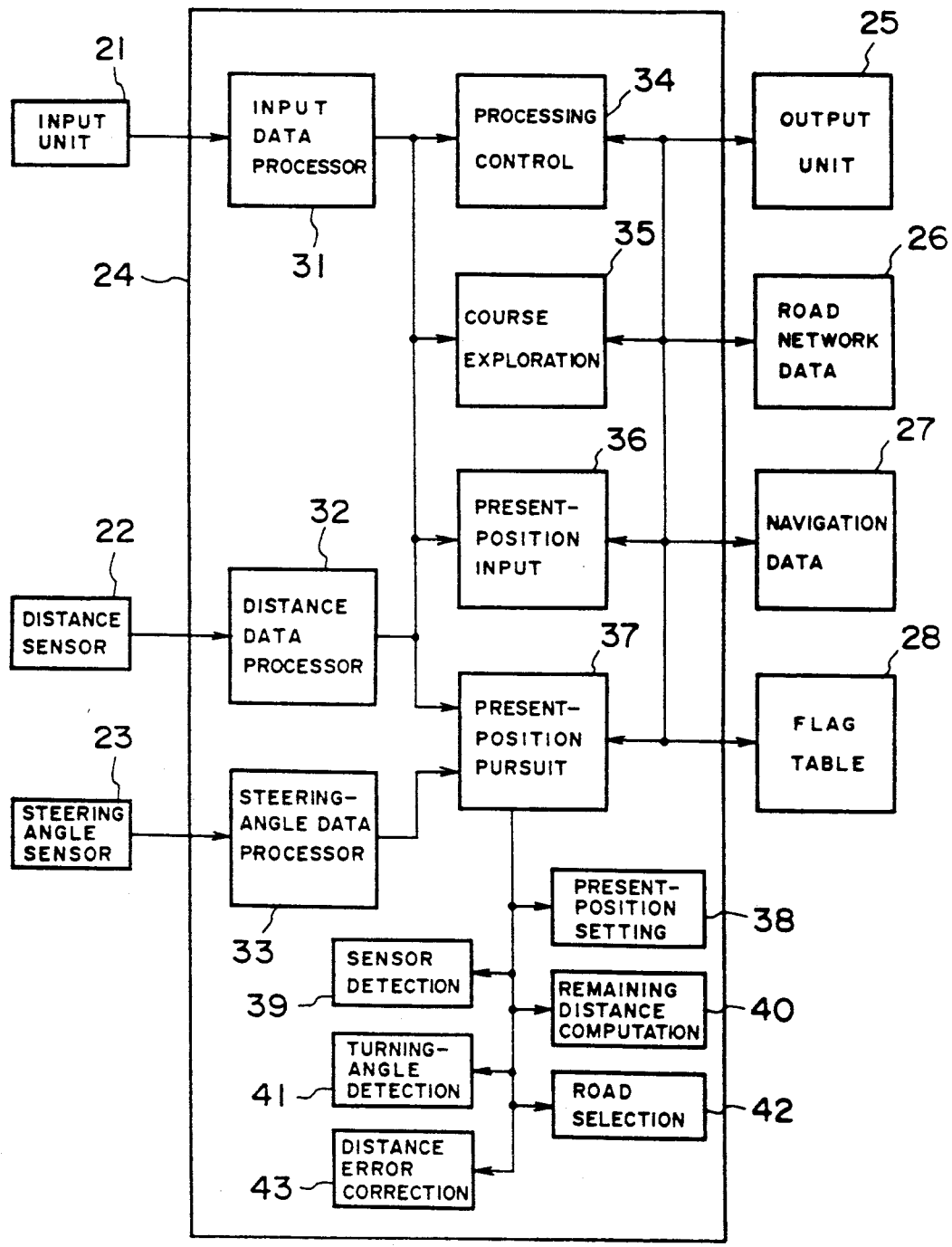
FIG. 14 is a view of a system arrangement for describing an embodiment of a navigation apparatus having a present-position calculation function according to the present invention.

In FIG. 14, an input unit 21 is constituted by input means using hard keys, touch input means for inputs from a display screen, etc. This is used for inputting destination, present position, start, etc. An output unit 25 comprises a display or audio output device, displays a menu necessary when inputting destination or present positions, and outputs course guidance information. Navigation data 27 comprises course guidance information, set course information and other data necessary for navigation. Navigation data generated by a navigation processor 24 are stored. A flag table 28 is a table for registering flags necessary when navigation is performed. In dependence upon the processing conditions, the table is accessed by the navigation processor 24 and may be suitably updated thereby. The navigation processor 24 accesses the navigation data 27 and flag table 28 and processes data and information entered from the input unit 21 as well as detection signals for the distance sensor 22 and turning angle sensor 23.

The navigation processor 24 has an input data processing module 31 for analyzing and processing the data and information entered from the input unit 21, a distance data processing module 32 for processing a detection signal from the distance sensor 22, and a steering angle data processing module 33 for processing a detection signal from the steering angle sensor 23. The processor 24 also has a plurality of processing modules for performing processing necessary for navigation based on the data and information entered from these processing units.

In accordance with designation information entered from the input unit 21, a processing control module 34 executes overall processing control of the navigation process 24 and, when necessary, refers to the flag table 28 to control a course exploration module 35, a present-position input module 36 and a present-position pursuit module 37.

When a destination is entered from the input unit 21, the course exploration module 35 searches for the optimum course for guidance to the destination while accessing the road network data (26). The module (35) sets optimum travelling directions to the destination at all intersections of the road network data (26) that is the subject of navigation. The data retrieved are stored in the navigation data (27). For a given intersection, a road is selected in accordance with the travelling direction set at this intersection, and the vehicle travels on this road. Then, at the next intersection and the intersection following it, roads are selected in accordance with the travelling directions repeatedly set in the same manner, and the vehicle travels on these roads. Thus, the settings are made such that the destination can be reached along the optimum course. Here the optimum course does not necessarily mean the shortest course. In course exploration, when taking into consideration road width, the number of intersections to be traversed, the quantity of traffic and other travel conditions, the optimum course is not always the shortest in terms of absolute distance, depending upon the weighting of these conditions. However, when calculated in terms of travelling time, retrieved courses are the shortest.

When present position is entered from the input unit (21) the present-position input module (36) identifies present position from the road network data (6) and navigation data (27), causes the corresponding intersection shape and orientation, landmarks, intersection name, the road in the direction of travel and the like to be displayed on the screen of the output unit (25) and set data necessary for navigation. It also sets a necessary flag in such a manner that pursuit of present position will start in response to a start input.

When course exploration is performed, navigation data are set and present position is inputted, the present-position pursuit module (37) starts, detects intersections based on the signals from the distance sensor (22) and steering angle sensor (23), the navigation data (27) and road data (26), and keeps track of present position while repeatedly executing present-position recognition processing every intersection. The status at such time is made a flag which is suitably set in the flag table (28). The transition to each processing step is judged by referring to this flag. To this end, the module (37) has submodules for initial position setting (38), sensor detection (39), remaining distance computation (40), turning point detection (41), road selection (42) and distance error correction (43) etc.

In order to detect present position by an intersection, remaining distance calculation (40) entails computing remaining distance to an intersection at all times and performing intersection recognition processing when distance remaining to an intersection attains a predetermined value. The turning-point detection (41) is for performing intersection recognition processing. Specifically, the starting and end points of a turn are detected in an error range of an intersection and turning point position corresponding to the intersection position is detected. Road selection (42) is for detecting a road actually selected upon passing through an intersection, irrespective of whether a road in the travelling direction given as guidance is selected. In accordance with this result, guidance in the direction of travel and the end-point intersection of this road is given. The distance error correction (43) corrects distance error and determines present position on the road in the travelling direction based on the detected turning point position and the selected road in the travelling direction. Specifically, distance remaining to the end-point intersection on this present-position road is determined.

Thus, by detecting present position at an intersection and recognizing the road in the travelling direction, guidance based on the selected road can be given and navigation may continue even if, despite the fact that guidance relating to the end-point intersection of the road is provided, the vehicle does not proceed in accordance with the guidance given at this intersection. In other words, guidance for direction of travel at every intersection is merely guidance; the arrangement is such that continued navigation is possible even if the road for which guidance is given is not taken as the direction of travel.

Processing performed by the navigation apparatus having the abovementioned present-position calculating function will now be described. Before discussing processing, a description will be given concerning an example of the structure of data prepared by the navigation apparatus possessing present-position calculating system according to the invention.

Figure 16A:
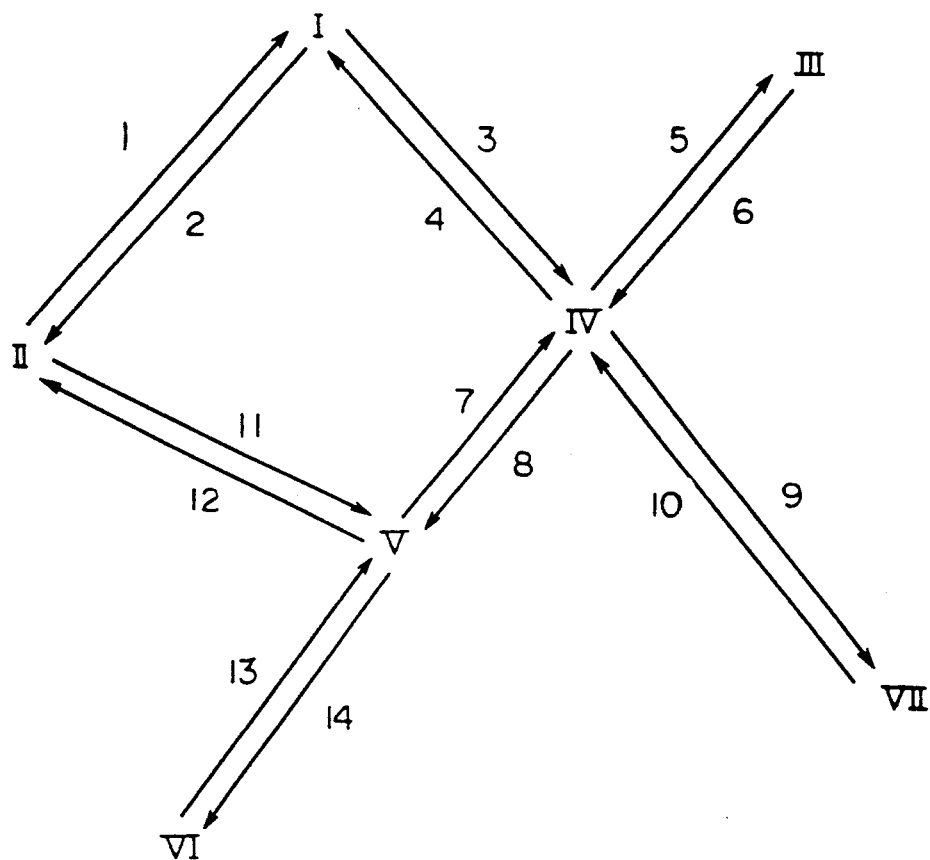

In case of a road network comprising intersection numbers I–VII and road numbers (1)–(14), as shown for example in FIG. 16(a), the intersection data will have a data configuration of the kind shown in (b) of FIG. 16, the road data a data configuration of the kind shown in (c), and the node data a configuration of the kind shown in (d).

As shown in (b) of FIG. 16, the intersection data possess information arranged to correspond to the intersection numbers I–VII, namely information relating to at least a road number which is the smallest of those of roads having the particular intersection as a starting point, a road number which is the smallest of those of roads having the particular intersection as an end point, the position (east longitude, north latitude) of the particular intersection, and the name of the intersection.

As shown in (c) of FIG. 16, the road data possess information arranged to correspond to the road numbers (1)–(14), namely information relating to at least a road number which is the next road having the same starting point, a road number which is the next road having the same end point, starting and end points based on intersection number, a node series pointer, and road length. As will be evident from the figure, a road number which is the next of those having the same starting point and a road number which is the next of those having the same end point can be generated by retrieving the same numbers from the starting and end points based on the intersection number. Also, road length can be obtained by adding the position information of the next node series data.

As shown in (d) of FIG. 16, the node series data possesses information relating to the number of nodes, which is placed at a leading position pointed out by the node series pointer of the road data, as well as node positions (east longitude and north latitude) regarding the nodes corresponding to the number thereof. In other words, a node series is arranged for each item of road data. The illustrated example indicates the node series of road numbers (1) and (2).

It will be evident from the structure of the foregoing data that a road number unit comprises a plurality of nodes. That is, the node series data represent a collection of data relating to one geographical point on a road. Letting a line connecting two nodes be referred to as an arc, a road is expressed by interconnecting a plurality of node series by arcs. For example, with regard to road number ①, A000 of the node series data can be accessed from the node series pointer of the road data, and thus it can be understood that the road number ① is composed of 15 nodes.

Take intersection number V as an example. For a course having this intersection as a starting point, first road number ⑦ is retrieved from the information relating to the road leaving the intersection, then road number ⑫ is retrieved from the information "NO. OF NEXT ROAD HAVING SAME STARTING POINT". Road number ⑭ is retrieved from similar information relating to road number ⑫, and then road number ⑦ is retrieved. Since road number is the road number ⑦ is started with above, it can be determined that there are no other road numbers available as peripheral roads. The same will hold true with regard to end points. If the intersection data and road data are used in this way, the numbers of roads entering and exiting each intersection can be retrieved and the lengths of routes connecting intersections can be obtained. By providing these data with travelling conditions such as roads that cannot be entered, illegal turns and road width, the result is information which will enable course exploration, described below, to be performed in great detail.

Figure 15:
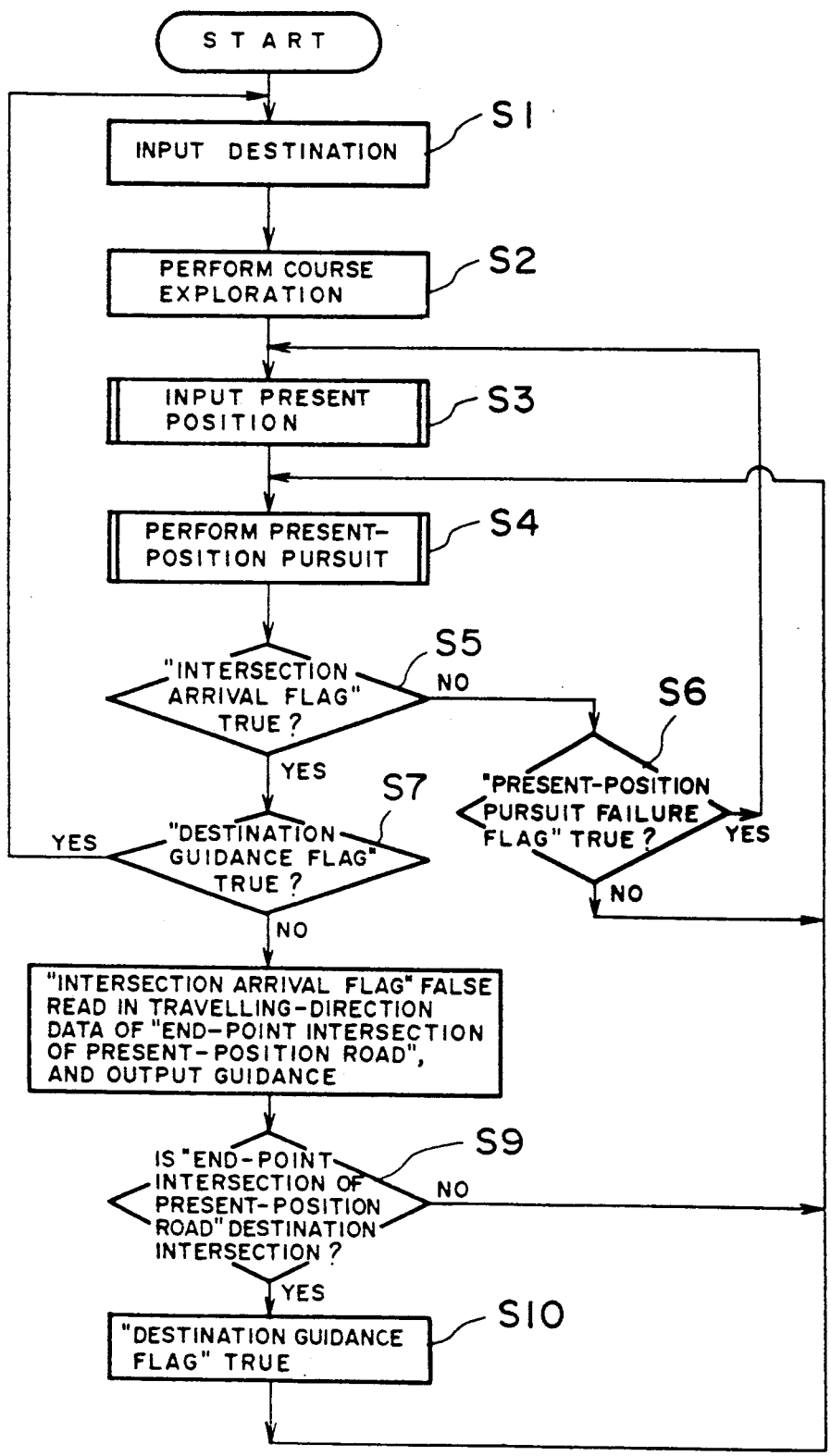
FIG. 15 is a view for describing the flow of overall processing.

The flow of overall processing will now be described with reference to FIG. 15.

Figure 17:
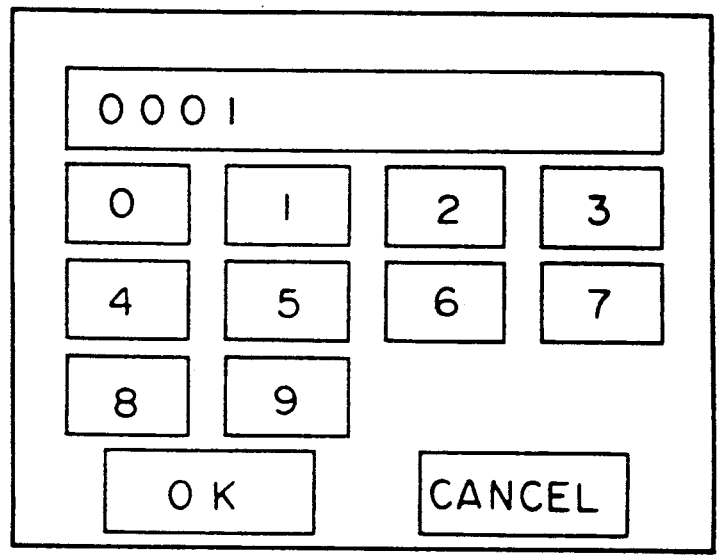
FIG. 17 is a view showing an example of a destination input menu screen.

(S1) Destination is entered first. By displaying a menu screen of the kind shown in FIG. 17, by way of example, in response to the destination input, the code ("0001") of the destination is entered by touching a numerical section serving as a ten-key pad.

Figures 18A, 18B:
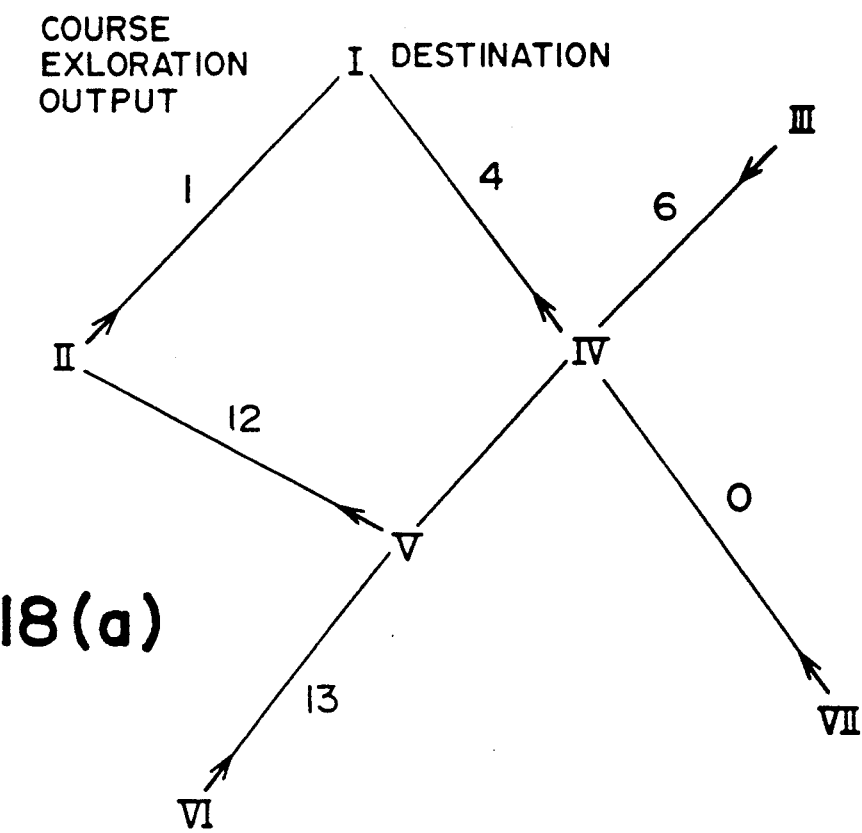
FIGS. 18(a)-18(b) are the views for describing an example of course exploration output.

(S2) Next, a transition is made to a course exploration mode, in which optimum course directions to each and every intersection are set. For example, as shown in FIG. 16(a), if intersection I is the destination, directions of travel to the destination are set for each of the intersections II–VII, as illustrated in FIG. 18(a). FIG. 16(b) shows an example of the data. In accordance with this course search, direction of travel at each intersection is set by successively obtaining, starting from the intersection nearest the destination, the direction that will give the shortest distance to the destination, by way of example.

(S3) Present position serving as point of departure is entered. Though a detailed description will be given below with reference to FIG. 20, in this processing the "PRESENT-POSITION PURSUIT FAILURE FLAG" and "DESTINATION GUIDANCE FLAG" are turned off.

Figure 21:
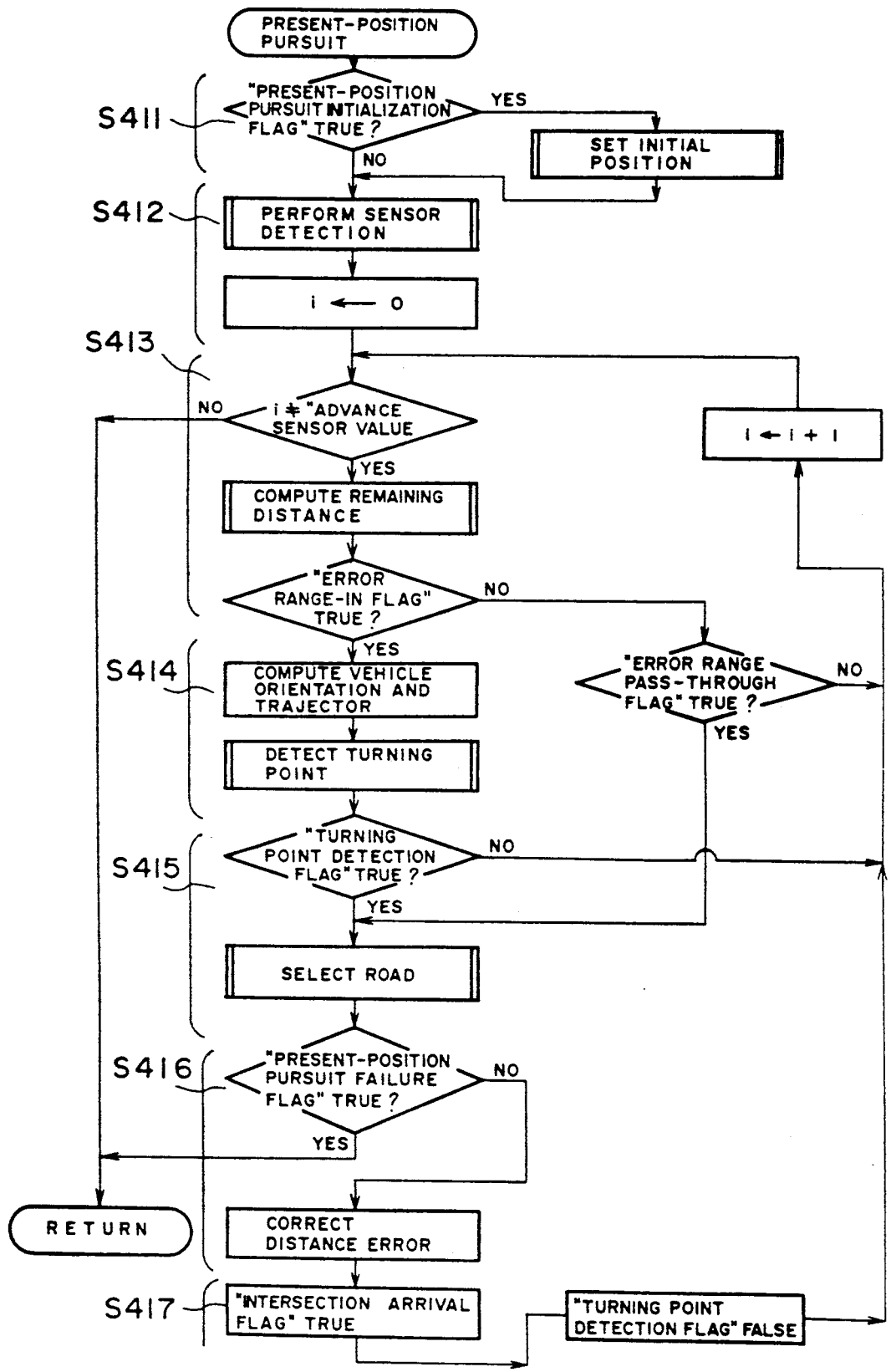
FIG. 21 is a view showing an example of a processing routine for keeping track of present position.

(S4) When processing for entering present position is carried out, guidance for direction of travel at this position becomes possible, and signals from the distance sensor and steering angle sensor are processed to keep track of present position in accordance with vehicle travel. Though the detailed description is given with reference to FIG. 21, this processing involves turning off an "INTERSECTION ARRIVAL FLAG" at an initial stage, keeping track of present position by recognizing information such as length of the present-position road, end-point intersection, node series and the like, turning on the "INTERSECTION ARRIVAL FLAG" when, by determining whether the vehicle has arrived at an intersection for which guidance has been given, the vehicle arrives at this intersection, and turning on the "PRESENT-POSITION PURSUIT FAILURE FLAG" when this intersection is detected.

(S5) After present-position pursuit processing, it is determined whether the "INTERSECTION ARRIVAL FLAG" is on or off.

(S6) If the "INTERSECTION ARRIVAL FLAG" is off and the "PRESENT-POSITION PURSUIT FAILURE FLAG" is found to be off upon checking to see whether this flag is on or off, this means that the vehicle has not strayed off course. Therefore, the program returns to step S4 and pursuit of present position continues. However, if the "PRESENT-POSITION PURSUIT FAILURE FLAG" is on, it is judged that the vehicle is off course, the program returns to step S3 and input of present position as the point of departure is performed again.

(S7) If the "INTERSECTION ARRIVAL FLAG" is on, then it is checked to see whether the "DESTINATION GUIDANCE FLAG" is on. The "DESTINATION GUIDANCE FLAG" is turned on at step S10, described below, when the end-point intersection of the present-position road becomes the destination intersection. If the "DESTINATION GUIDANCE FLAG" is on, this means the end of guidance to the destination intersection and, hence, the program returns to the initial destination input processing.

Figure 19:
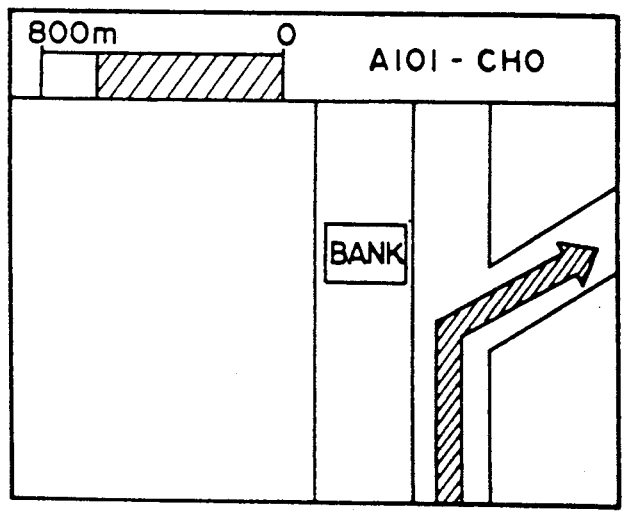
FIG. 19 is a view showing an example of guidance output.

(S8) However, if the "DESTINATION GUIDANCE FLAG" remains off as before, this means that the destination intersection is further ahead than the next intersection. Therefore, travelling direction data of the end-point intersection of the present-position road is read and, as shown in FIG. 19, the shape of the intersection, its characteristics, landmarks and direction of travel to the intersection are displayed on the screen and guidance regarding the intersection is given by displaying the name of the intersection and the distance remaining to the intersection. Also, the "INTERSECTION ARRIVAL FLAG" is turned off at this time.

(S9) Next, it is checked to see whether the end-point intersection of the present-position road is the destination intersection. If it is not the destination intersection, the program returns to the pursuit of present position at step S4.

(S10) If the end-point intersection of the present-position road is the destination intersection, the "DESTINATION GUIDANCE FLAG" is turned on and the program returns to pursuit of present position at step S4.

The foregoing is the flow of overall processing.

The main processing routines of the foregoing steps will now be described in further detail.

Figure 20A:
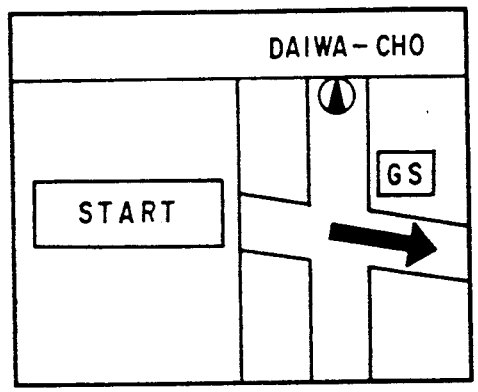
FIGS. 20(a)-20(b) are the views showing a processing routine for inputting present position.
Figure 20B:
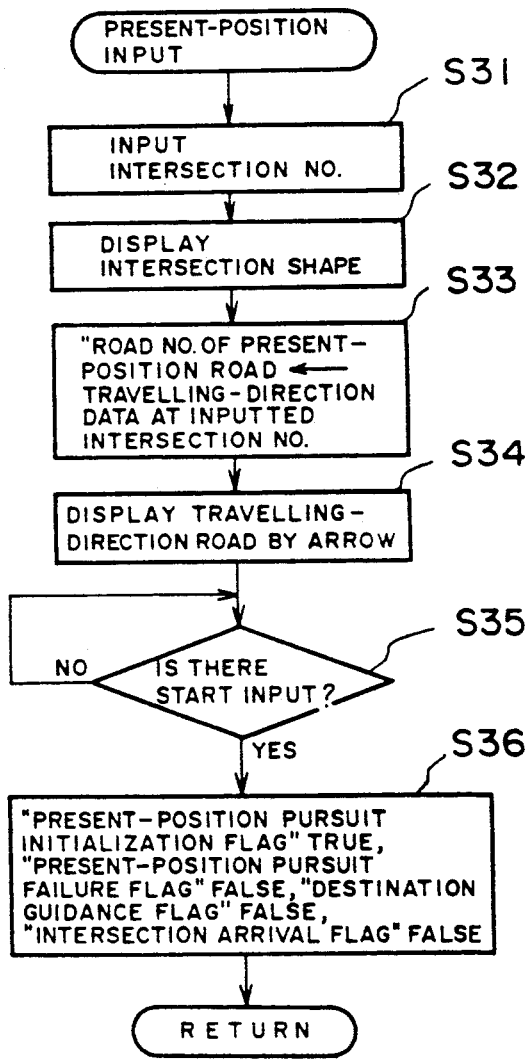

When the number of an intersection is entered the processing routine of the present-position input step S3, intersection orientation, shape, name and intersection landmarks are identified from the intersection data, road data and node series data described earlier, whereupon the intersection name, intersection characteristics and direction of travel are displayed on the screen, as shown in FIG. 20(a) (S31, S32). Travelling-direction data at the intersection number entered, based on the travelling-direction data shown in FIG. 18(b), as the road number of the present-position road, are stored, and the road of the direction of travel is display and indicated by an arrow, as shown in FIG. 20(a) (S33, S34). Thereafter, the system waits until there is a start input. When the driver makes a start input upon passage through an intersection, a "PRESENT-POSITION PURSUIT INITIALIZATION FLAG" is turned on and the "PRESENT-POSITION PURSUIT FAILURE FLAG", the "DESTINATION GUIDANCE FLAG"

and the "INTERSECTION ARRIVAL FLAG" are turned off (S35, S36).

Figure 22:
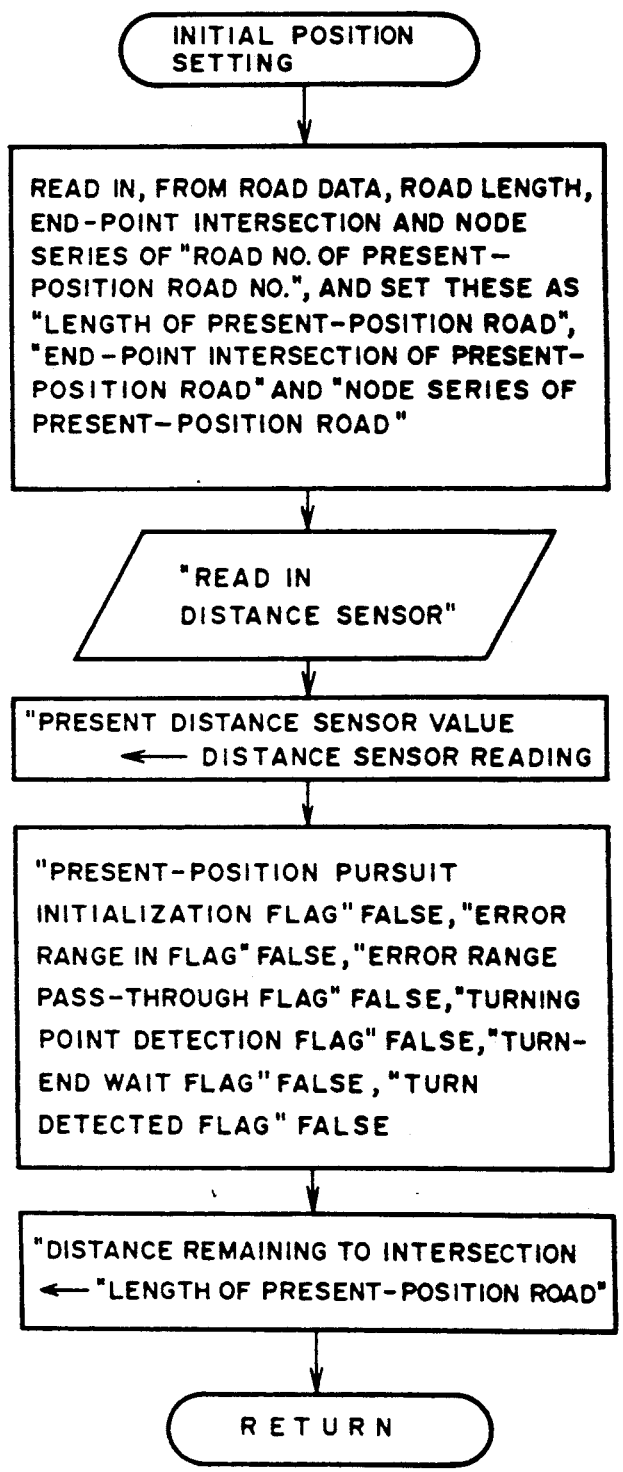
FIG. 22 is a view showing an example of a processing routine for setting initial position.

As for the present-position pursuit processing routine, first it is determined (S411) whether the "PRESENT-POSITION PURSUIT INITIALIZATION FLAG" is on. In a case where initial data for present-position pursuit have not been set, this flag will be on due to mere entry of present position. As a result, initial position setting shown in FIG. 22 is carried out. Since the "PRESENT-POSITION PURSUIT INITIALIZATION FLAG" will be turned off when this setting is performed, there is a direct transition to the next step thereafter.

In the setting of initial position, road length, endpoint intersection and node series are read in from the road data and node series data in accordance with the "ROAD NO. OF PRESENT-POSITION ROAD", as shown in FIG. 22, and these are set as "LENGTH OF PRESENT-POSITION ROAD", "END-POINT INTERSECTION OF PRESENT-POSITION ROAD" and "NODE SERIES OF PRESENT-POSITION ROAD". Further, the distance sensor signal is read in and this value is set as "PRESENT DISTANCE SENSOR VALUE". Here the "PRESENT-POSITION PURSUIT INITIALIZATION FLAG", an "ERROR RANGE IN FLAG", an "ERROR RANGE PASS-THROUGH FLAG", the "TURN-END WAIT FLAG", the "TURNING POINT DETECTION FLAG" and the "TURN DETECTED FLAG" are turned off and "LENGTH OF PRESENT-POSITION ROAD" is set as "DISTANCE REMAINING TO INTERSECTION".

Figure 23:
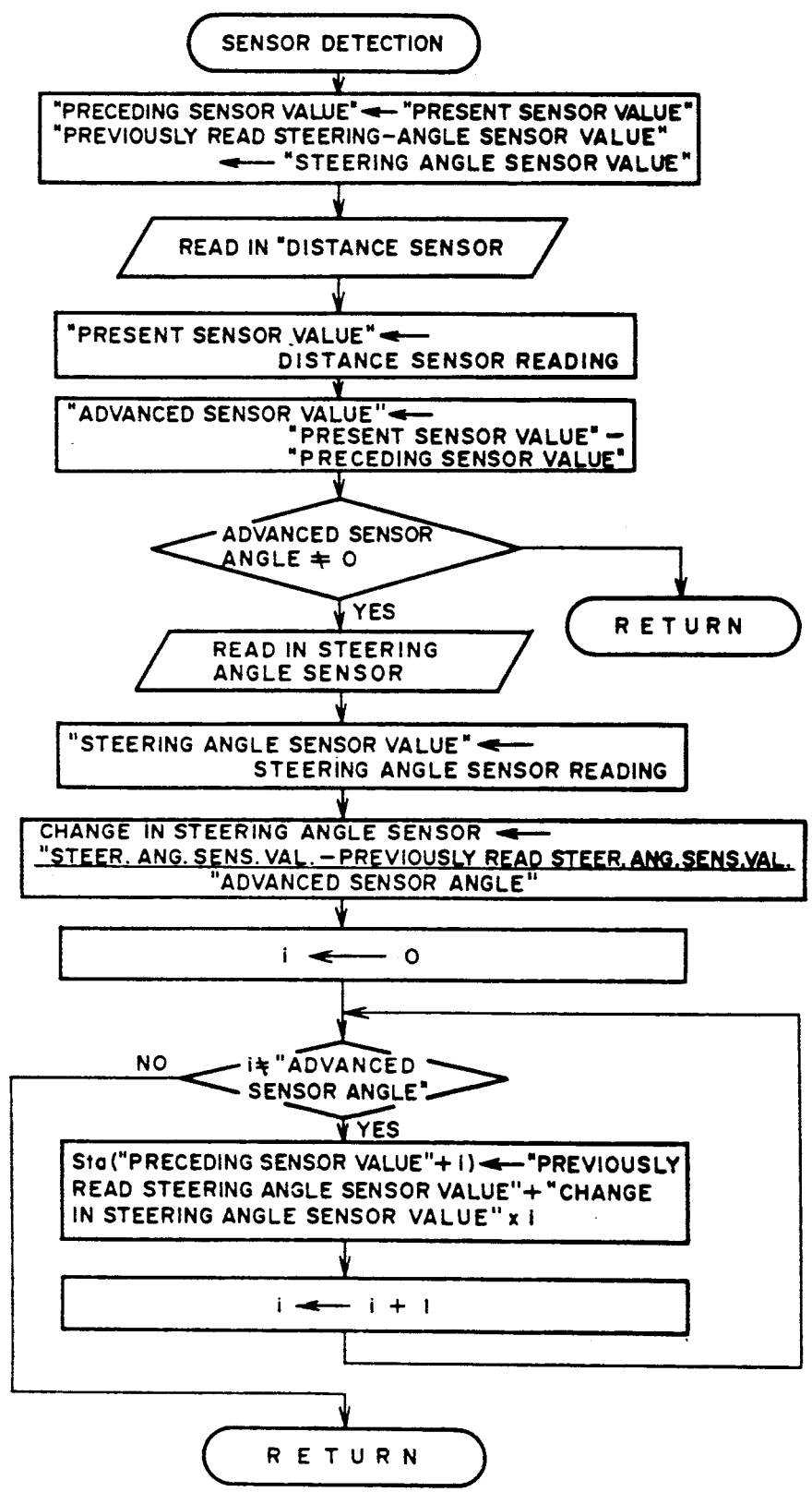
FIG. 23 is a view showing an example of a sensor detection processing routine.

(S412) Next, sensor detection processing shown in FIG. 23 is performed. In accordance with this processing, first the present sensed values of distance and steering angle are set as the preceding sensed values, after which the sensed values are read in and serve as present sensed values. The amount of change in steering angle corresponding to traversed distance is obtained, and the steering angle Sta at the present position is determined.

Figure 24:
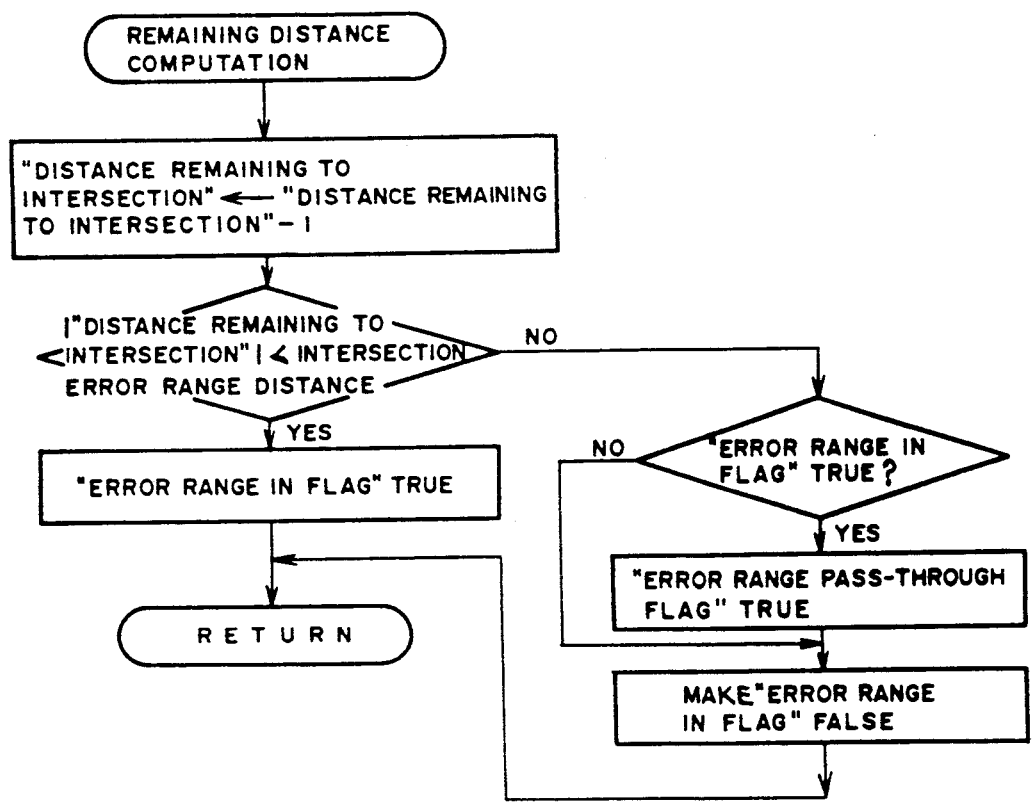
FIG. 24 is a view showing an example of a processing routine for computing remaining distance.

(S413) After the loop counter is made 0, processing from remaining distance computation onward is repeatedly executed while the loop counter i is incremented until i becomes the traversed distance. In computation of remaining distance, as shown in FIG. 24, it is determined whether the value has fallen within the intersection error range distance while distance remaining to the intersection is sequentially subtracted. Until the distance remaining to the intersection falls within the intersection error range distance, the "ERROR RANGE IN FLAG" is turned off and the computation of remaining distance is performed repeatedly. When the distance remaining to the intersection falls within the intersection error range distance, the "ERROR RANGE IN FLAG" is turned on. If the value emerges from the intersection error range distance after the "ERROR RANGE IN FLAG" has been turned on, then the "ERROR RANGE PASS-THROUGH FLAG" is turned on.

(S414) When the "ERROR RANGE IN FLAG" is turned on, computation of vehicle orientation and trajectory is performed to carry out turning point detection.

(S415) It is checked to see whether the "TURNING POINT DETECTION FLAG" is on. If it is off, the counter i is incremented and similar processing is repeated. If it is on, road selection is carried out.

If the value falls within the intersection error range distance and the "ERROR RANGE IN FLAG" is turned on but the intersection is not detected and the value emerges from the intersection error range distance with the "TURNING POINT DETECTION FLAG" left off, then, as described above in connection with S413, the "ERROR RANGE IN FLAG" turns off and the "ERROR RANGE PASS-THROUGH FLAG" turns on. Since this includes a case where the vehicle passes through an intersection without turning, selection of the next road is performed in similar fashion in this case also.

(S416) It is determined whether the "PRESENT-POSITION PURSUIT FAILURE FLAG" is on. If the flag is on, the program returns from steps S5, S6 of FIG. 15 ot S3. If the flag remains off, distance error correction is performed next.

(S417) The "INTERSECTION ARRIVAL FLAG" is turned on, the loop counter i is incremented and the same processing is executed.

Thus, as set forth above, various flags are used in order to process information in the navigation apparatus having the present-position calculation system according to the invention. The principal ones of these flags will now be described.

"INTERSECTION ARRIVAL FLAG": If this flag is on, output of guidance for the next intersection is provided. This flag is turned off at the time of present-position input processing and is turned on when the vehicle passes through an intersection.

"DESTINATION GUIDANCE FLAG": In a case where this flag is on when the vehicle arrives at an intersection, arrival at the destination is judged, the main routine is started and the program returns to the beginning (destination input processing). This flag is turned off at the time of present-position input processing. It is turned on if the next intersection is the destination at the time of guidance output for the next intersection.

"PRESENT-POSITION PURSUIT FAILURE FLAG": If this flag is on, the program returns in present-position pursuit processing. In the main routine, a branch is effected in such a manner that present-position inut is performed again. This flag is turned off at the time of present-position input processing. When road selection is performed, this flag is turned on in a case where there is no road to be selected.

"PRESENT-POSITION PURSUIT INITIALIZATION FLAG": If this flag is on, the initial position setting routine is called. This flag is turned off at the time of initial position setting and is turned on at the time of present-position input.

"ERROR RANGE IN FLAG": If this flag is on, trajectory computation, turning point detection and the like are carried out. The flag is turned on if the value is within the intersection error range; otherwise, this flag is turned off.

"ERROR RANGE PASS-THROUGH FLAG": If this flag is on, road selection is carried out. The flag is turned on if the vehicle passes through the intersection error range and is turned off otherwise.

"TURNING POINT DETECTION FLAG": If this flag is on, road selection is performed in present-position pursuit and resetting of present position is carried out in distance error correction. If this flag is off, turn starting point, turn end point and turning point are set in vehicle turning-angle computation. The flag is turned off at the time of initial position setting, turned on when a turning point is detected and turned off after distance error correction.

"TURN-DETECTED FLAG" and "TURN-END WAIT FLAG": These are for detecting a turn as well as the end point of a turn and are turned off by setting initial position. The "TURN-DETECTED FLAG" is turned on when steering angle exceeds a threshold value. These flags are on/off controlled depending upon whether rotational angle has exceeded 20°.

A modification of the navigation apparatus having the foregoing present-position calculation system will now be described.

Figure 25:
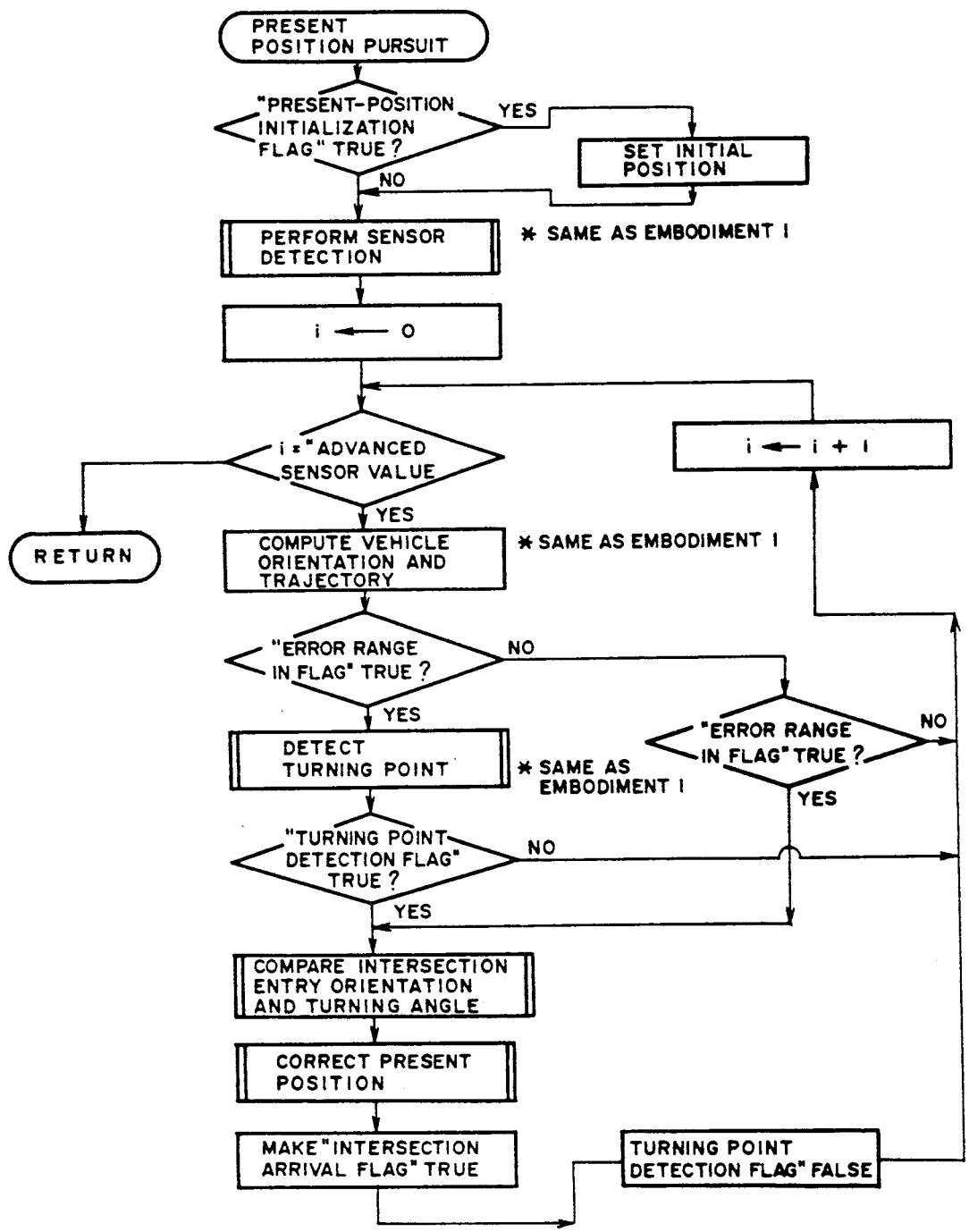
FIG. 25 is a view showing a modification of the processing routine for keeping track of present position.

The above-described embodiment is for keeping track of present position by road number and remaining distance from the end-point intersection of this road number. The embodiment shown in FIG. 25, however, keeps track of present position by identifying intersections based on coordinates. Accordingly, in processing for present-position pursuit, processing is the same as in the foregoing embodiment up to detection of turning point. However, instead of the processing from road selection to distance error correction performed in the foregoing embodiment, processing at the time the vehicle passes through an intersection is such that processing for comparing intersection entry orientation and turn angle and processing for correcting present position are carried out.

Figure 26A:
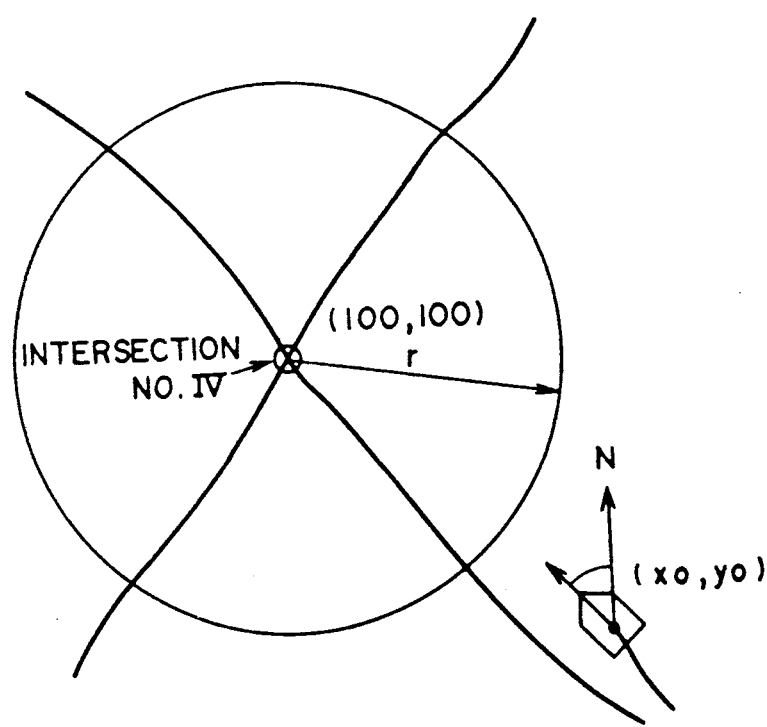
FIGS. 26(a)-26(c) are the views for describing turning point detection.
Figure 26B:
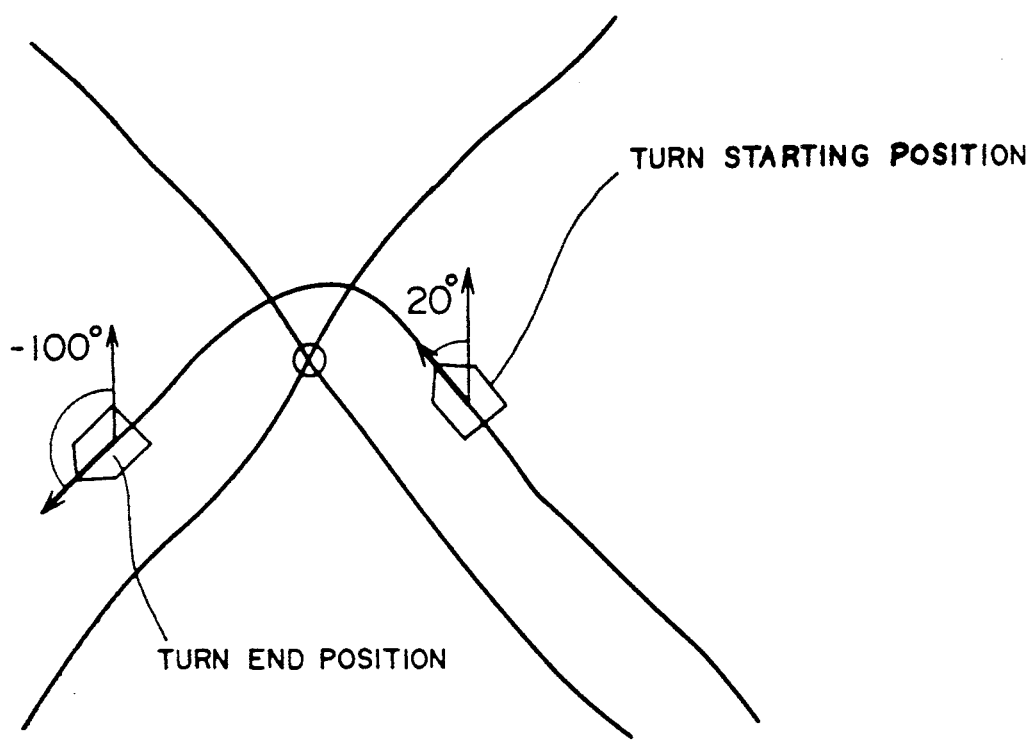
Figure 26C:
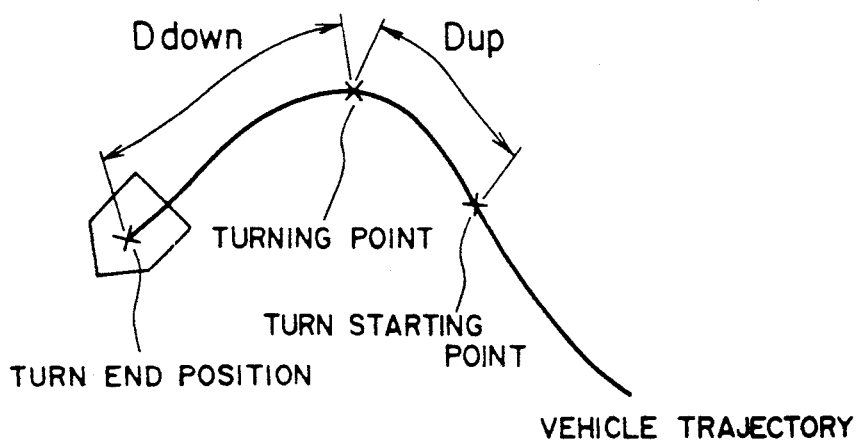

In the example shown in FIG. 26, entry into the error range of an intersection is recognized when the vehicle penetrates a circle having a fixed radius measured from the intersection. For example, let r represent a distance within the error range of intersection coordinates $(x_c, y_c)$. It will be construed that the vehicle has penetrated the circle shown in FIG. 26(a) when a position is reached at which coordinates $(x_o, y_o)$ of the present position (vehicle position) satisfy the condition $$(x_c - x_o)^2 + (y_c - y_o)^2 < r^2$$

Then, as shown in FIG. 25(b), turn detection is carried out and the positions of the turn starting point and end point are detected. Letting the orientations of these positions be —(20°) and 100°, respectively, trajectory turning angle is obtained as follows:

trajectory turning angle = (turn-end position orientation) — (turn-start position orientation) = —100° — (—20°) = —80°

Further, turning-point position is detected and we have the following:

$D_{up}$ = |turning-point position — turn-start position|
$D_{down}$ = |turn-end position — turning-point position|

In processing for comparing intersection-entry orientation and turning angle, roads entering read out of entering roads of the intersection data and roads having the same end points in the road data, and orientations when the intersection is entered from these roads are found as orientations of the position of $D_{UP}$ from the intersection position on the node series for each road. Let these orientations be as as follows, as illustrated in (b) of FIG. 27:

| ROAD NO. | ORIENTATION AT ENTRY OF INTERSECTION IV |
|---|---|
| ③ | 150° |
| ⑥ | —100° |
| ⑦ | 60° |
| ⑩ | —25° |

In such case, in the example of FIG. 26(b), road number (10), which has an entry orientation nearest the orienation (20°) of the turn-start position, is adopted as the road entering the intersection.

When the entering road has been obtained, roads exiting the intersection number IV and roads having the same starting point from the road data are read out, the vehicle proceeds from the entering road to ⑩ to these roads. In this processing, the change is found between orientation at the position $D_{down}$ and the turn-start position on the entering road, the change being determined from the intersection position on the node series of the exiting roads. Accordingly, observing the relationship between the incoming road ⑩ and each of the exiting roads ④, ⑤, ⑧ and ⑨, we have

| ROAD NO. | TURN-END POSITION ORIENTATION AND TURN ANGLE |
|---|---|
| 4 | —30° — (—25°) = —5° |
| 5 | 80 — (—25°) = 105° |
| 8 | —120 — (—25°) = —95° |
| 9 | 155 — (—25°) = 180° |

Accordingly, in the example of FIG. 26(b), since the trajectory turning angle is —80°, a decision is rendered to the fact that road ⑩ ⑧ at the turning angle closest to —80° is the direction of travel.

Figure 28:
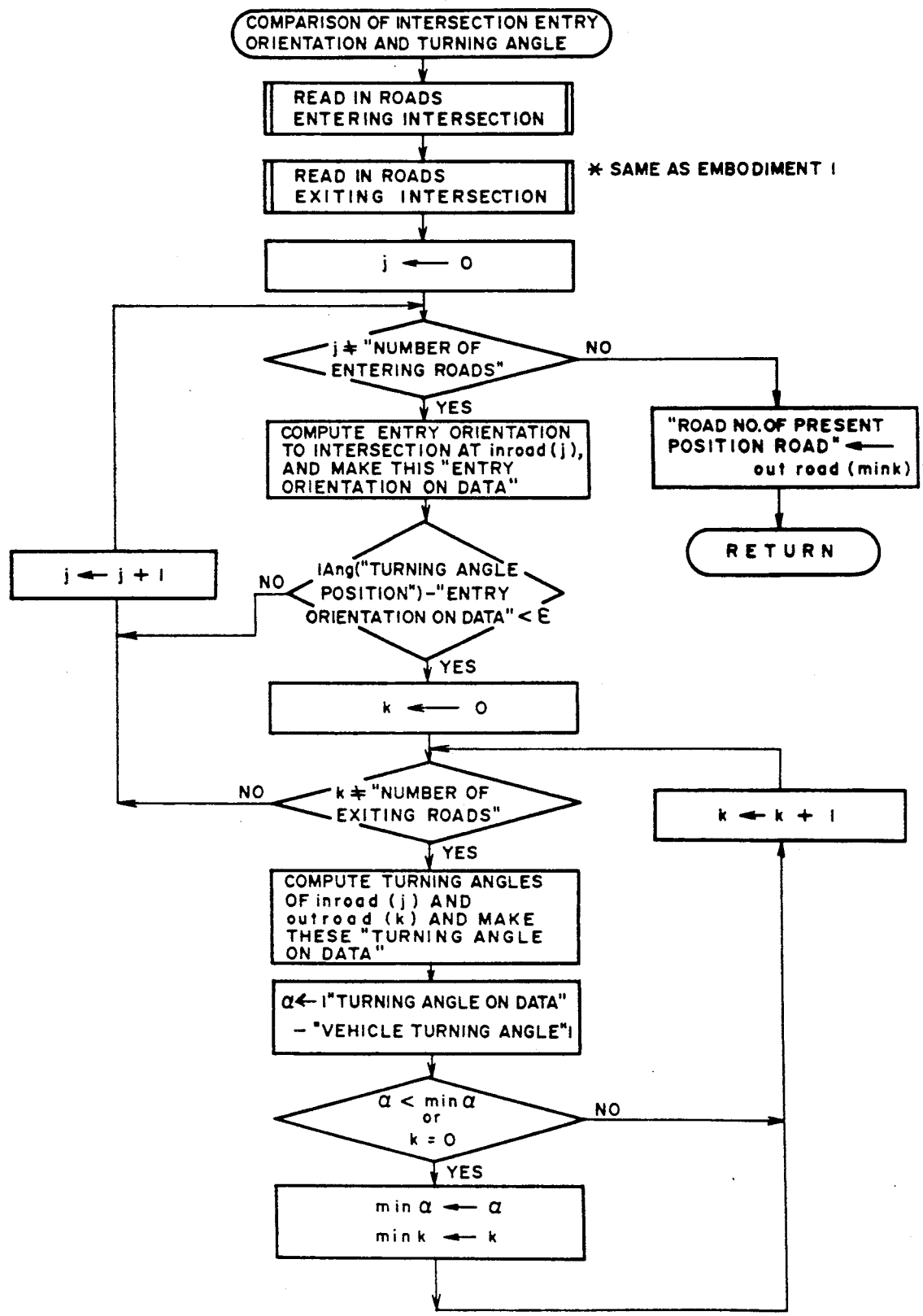
FIG. 28 is a view showing an example of a processing routine corresponding to the processing of FIG. 27.

The processing routine for comparing intersection-penetration angle and turning angle is shown in FIG. 28. The processing routine illustrated in FIG. 28 is as follows:

First, processing for reading in roads entering an intersection is performed.

Figure 29:
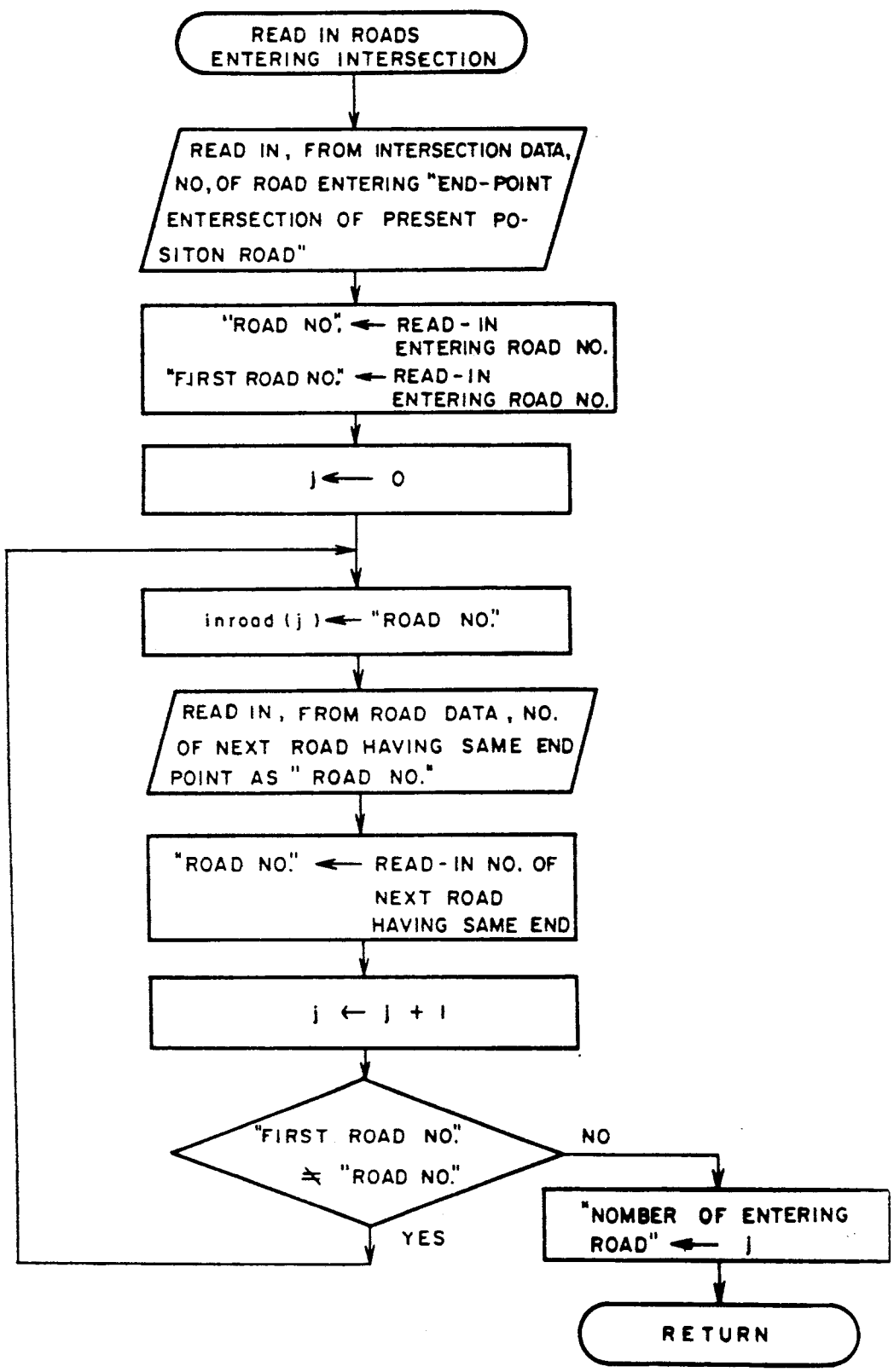
FIG. 29 is a view showing an example of a processing routine for reading in a road entering an intersection.

In this processing, as shown in FIG. 29, the numbers of roads entering an end-point intersection of a present-position road are read in from the intersection data, and these numbers are set to "ROAD NO." and "INITIAL ROAD NO.", respectively. The loop counter j is set to 0. Next, while incrementing the loop counter j, the next road number having the same end point is successively read out of the road data until the "INITIAL ROAD NO." is attained, whereby all road numbers are read out and the number thereof is set to "NUMBER OF ENTERING ROADS". In other words, processing is executed that corresponds to the processing, described earlier with reference to FIG. 9, for reading in the numbers of the roads exiting an intersection.

Similarly, processing, described with reference to FIG. 9, for reading in the number of roads exiting an intersection is performed and the loop counter j is set to 0.

Figure 27A:
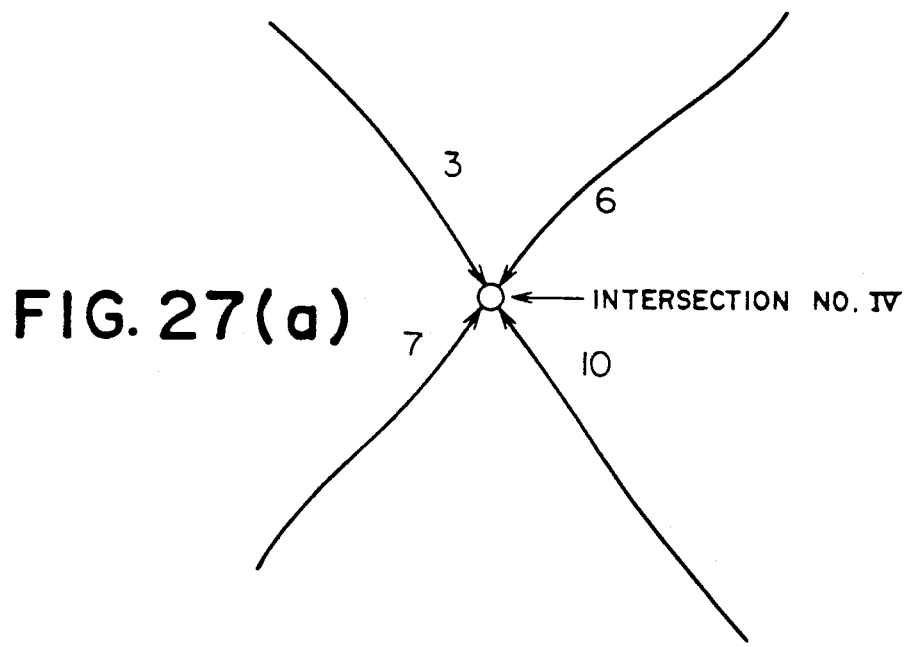
FIGS. 27(a)-27(c) are the views for describing processing for comparing intersection penetration orientation and turning angle.
Figure 27B:
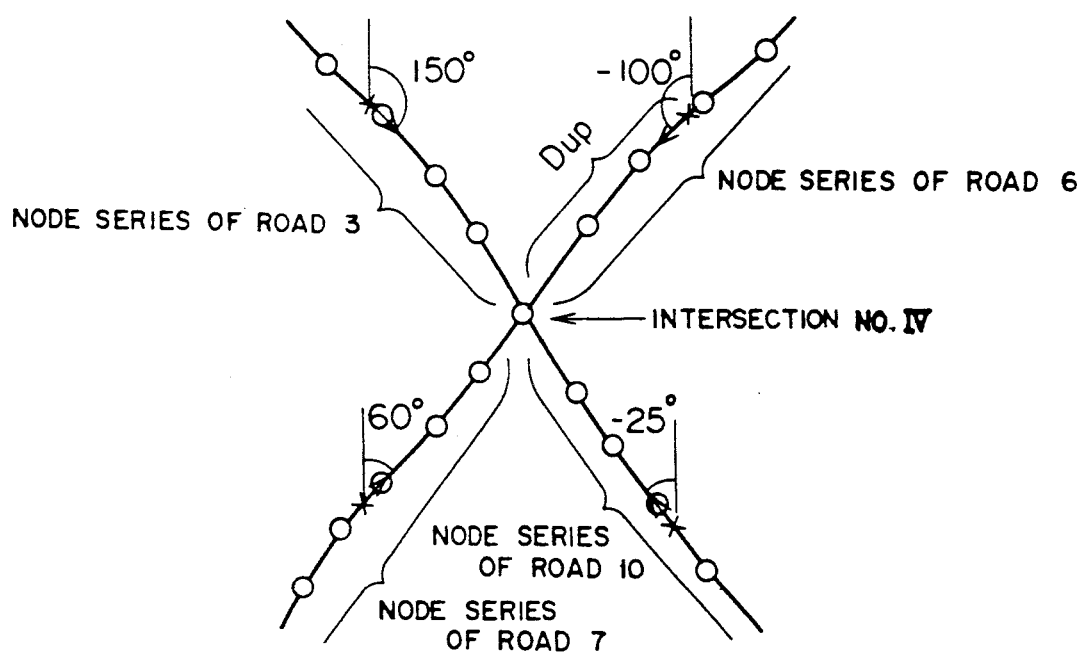
Figure 27C:
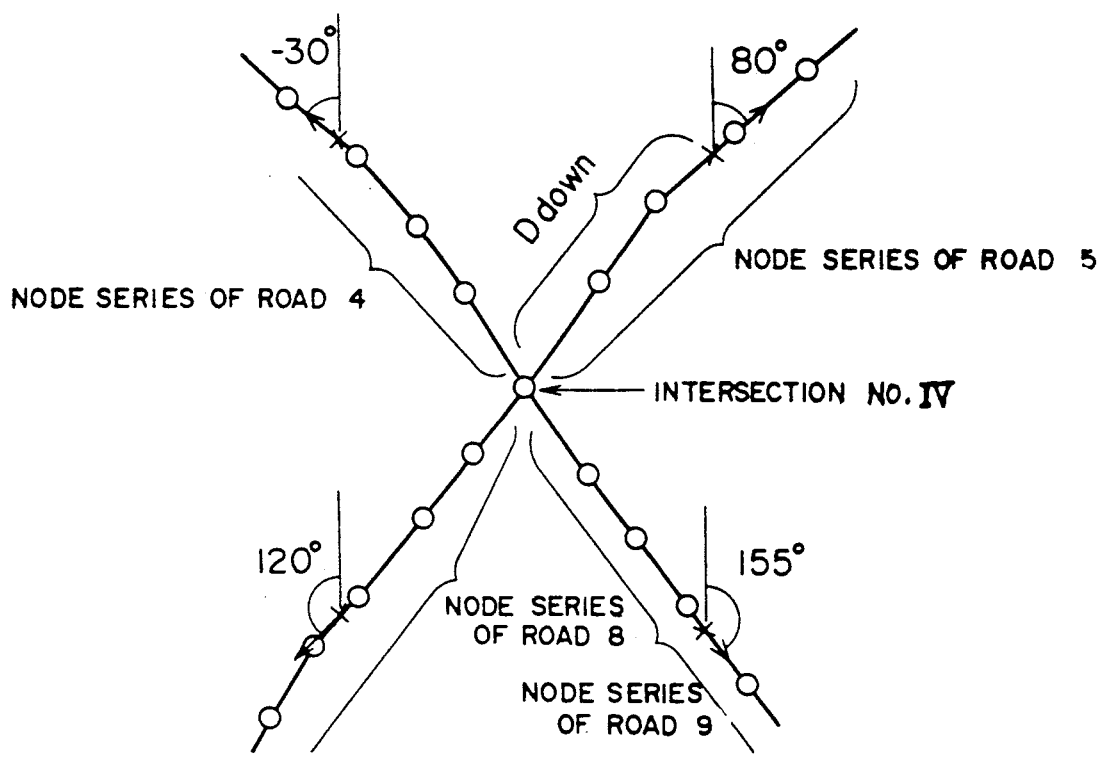

The entering roads shown in FIG. 27(b) are judged while incrementing the loop counter j up to the number entering roads, then the loop counter k is set to 0, turning angle is computed while the counter k is incremented up to the number of exiting roads, and judgment of the road in the travelling direction shown in FIG. 27(c) is executed. The road in the travelling direction thus obtained is set as the road number of the present-position road.

Figure 30A:
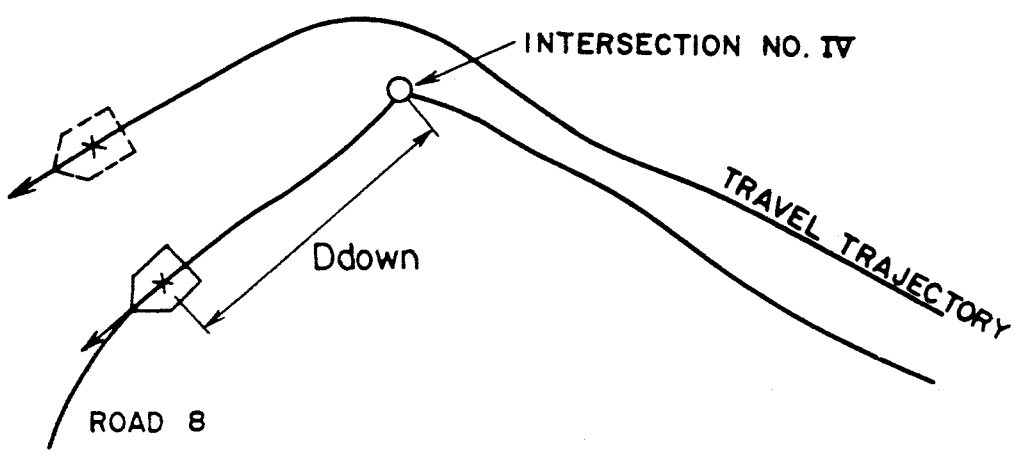
FIGS. 30(a)-30(b) are the views for describing present-position correction processing.
Figure 30B:
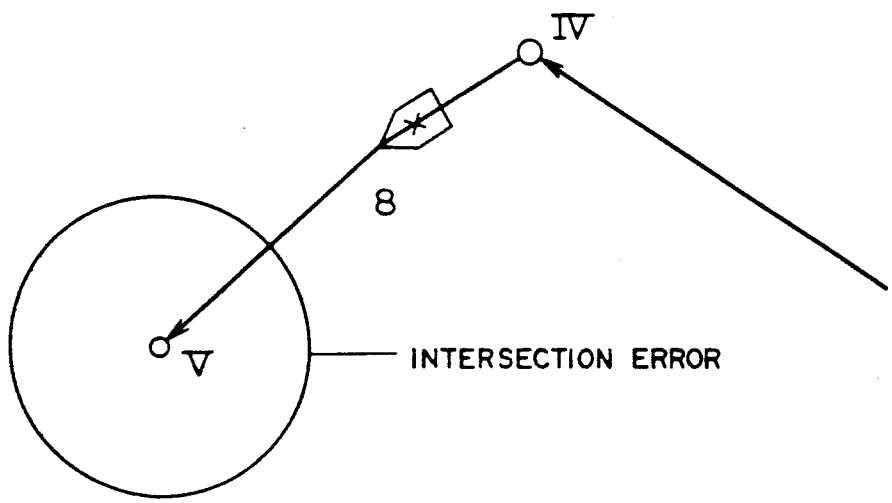

Correction of present position is performed after the road number of the present-position road is determined. In this processing, as shown in FIG. 39(a), present-position coordinates are adopted as the turn-end coordinates on the node series of road ⑧, and present-position orientation is adopted as turn-end position orientation (−120°) on the node series. As shown in (b) of FIG. 30, the end-point intersection V of road number (8) is read out of the road data as the next intersection, the coordinates of this intersection are read out of the intersection data, and penetration of the vehicle into the error range of the intersection V is monitored.

Figure 31:
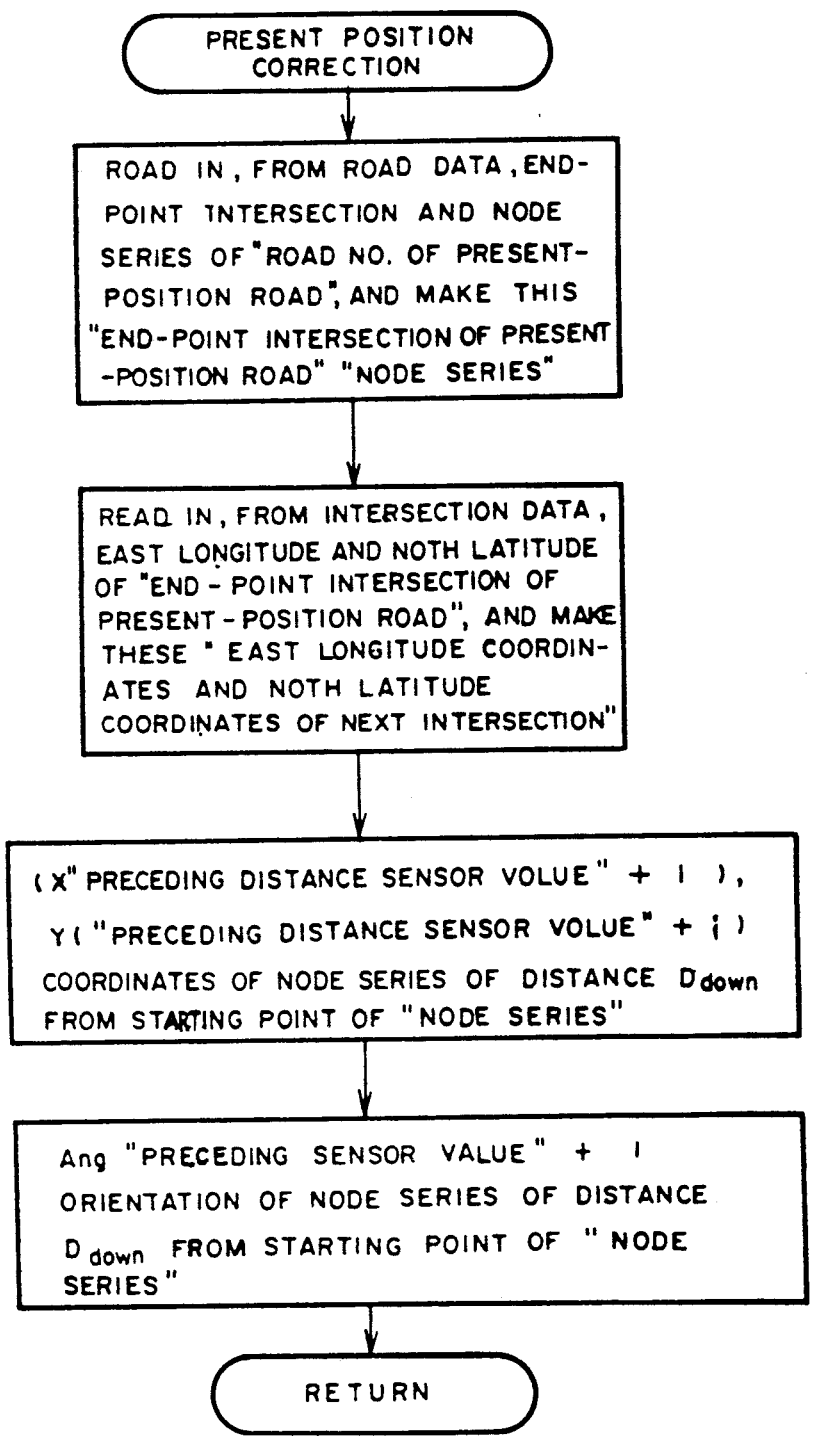
FIG. 31 is a view showing an example of a processing routine corresponding to the processing of FIG. 30.

FIG. 31 illustrates the processing routine for correcting present position. This processing routine is as follows:

First, the end-point intersection of the road number of the present-position road and the node series are read in from the road data, and these are adopted as "END-POINT INTERSECTION OF PRESENT-POSITION ROAD" and "NODE SERIES", respectively.

Further, the coordinates of east longitude and nort latitude of "END-POINT INTERSECTION OF PRESENT-POSITION ROAD" are read in and adopted as "COORDINATES OF EAST LONGITUDE AND NORTH LATITUDE OF NEXT INTERSECTION".

The coordinates on the node series of the distance of $D_{down}$ from the starting point of "NODE SERIES" are adopted as the present-position cordinates [X("PRECEDING DISTANCE SENSOR VALUE"+i), Y("PRECEDING DISTANCE SENSOR VALUE"+i)], respectively, and the orientation between nodes at the distance of $D_{down}$ from the starting point of "NODE SERIES" is adopted as the orientation of the present position.

The present invention is not limited to the foregoing embodiments but can be modified in various ways. For example, it goes without saying that 20°, which is used as the rotational angle for judging whether a turn has been made at an intersection, and 40°, which is used as the angle for judging whether the road is the pertinent road in the direction of travel, can be modified in dependence upon judgment precision, etc. Further, though it is judged that the road is the present-position road in a case where the difference $\epsilon$ between turning angle of the connecting road and the turning angle of the vehicle is the minimum value ($\min \epsilon$) and this value is less than 40°, it is permissible to decide that the road for which $\min \epsilon$ holds is the present-position road without setting such a tolerance value. Furthermore, though it is arranged to keep track of present position, identify present position every intersection by the distance sensor and steering angle sensor and then changeover the guidance information, course guidance can be performed even without sensors when the course exploration data according to the invention are used. In other words, even if the sensors can no longer be used owing to a malfunction, back-up is available by means of a trigger switch or the like. An example of this will be described next.

Figure 32:
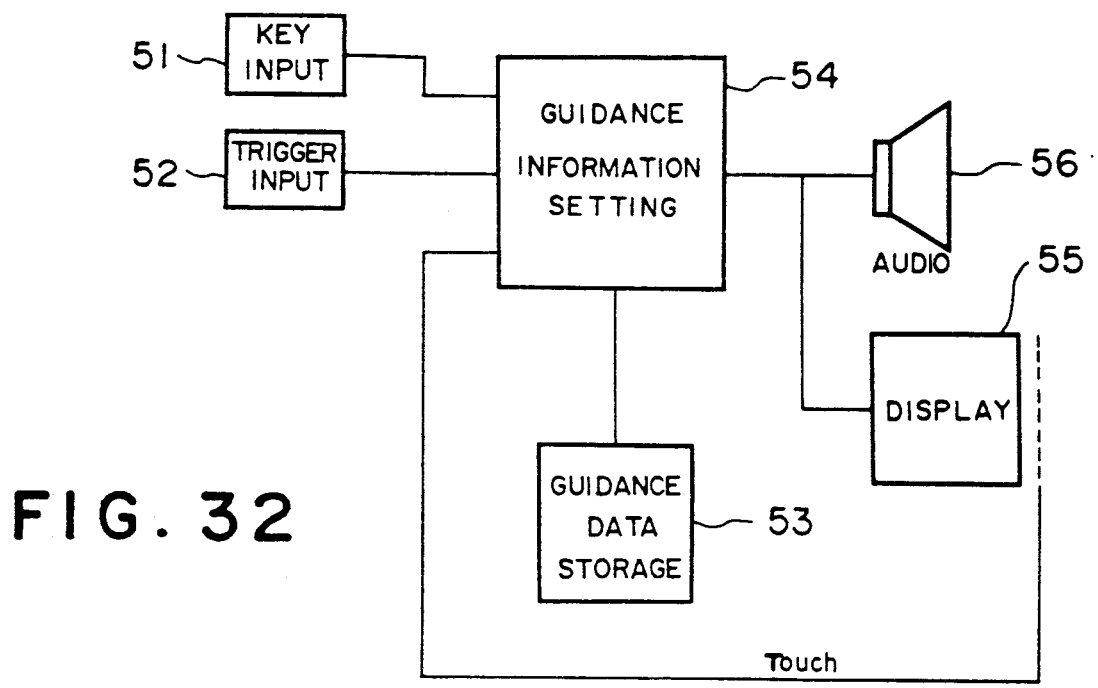
FIG. 32 is a view showing a modification of the navigation apparatus according to the invention.
Figure 33:
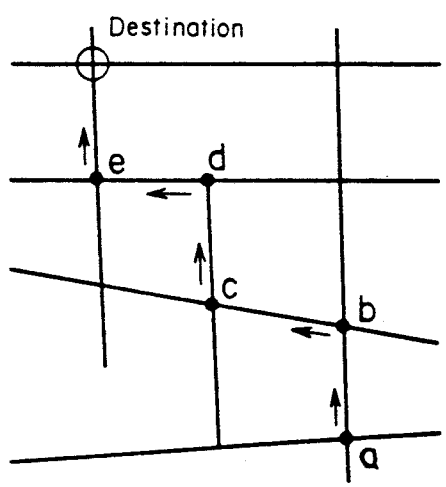
FIG. 33 is a view showing an example of a course sequence.

In FIG. 32, numeral (51) denotes key input means, (52) trigger input means, (53) guidance data storage means, (54) guidance information setting means, (55) display output means and (56) audio output means. The key input means (51) comprises a ten-key pad and function keys and is capable of inputting code numbers of predetermined geographical locations, such as destination and present location (guidance location). The trigger input means (52) comprises a touch switch, push-button switch or the like and is for inputting a single trigger signal. The guidance data storage means (53) is a memory such as a ROM in which navigation data indicative of geographical points, such as destinations and present positions, as well as information are stored in advance. The guidance information setting means (54) is constituted by, say, a CPU, executes key-input processing, course exploration and the like, sets information for guidance to a destination as by course exploration in correspondence with geographical points stored in the guidance data storage means (53) and stores this information in a memory such as a RAM. Accordingly, this arrangement includes the main constituents of FIG. 14. When a code number indicative of the present location is entered by the key input means (51) the display output means (55) and audio output means (56) output guidance information set by the guidance information setting means (54) for this location. When the trigger signal is entered by the trigger input means (52) there is an output of guidance information, set by the guidance information setting means (54) for the next geographical point, relating to a course leading to a destination in accordance with the path sequence a, b, c, . . . shown in FIG. 33, by way of example. If only intersections serve as geographical points, the guidance information is an indication to, say, turn left or right at the next intersection, and this guidance is given at the intersection serving as the guidance point. In a case where there is a second intersection encountered immediately after turning at the aforementioned next intersection, it is of course possible for the outputted guidance information to include the direction of the first turn along with information designating the proper lane to take after the turn, as well as the direction of the second turn and the associated guidance information.

Figure 34:
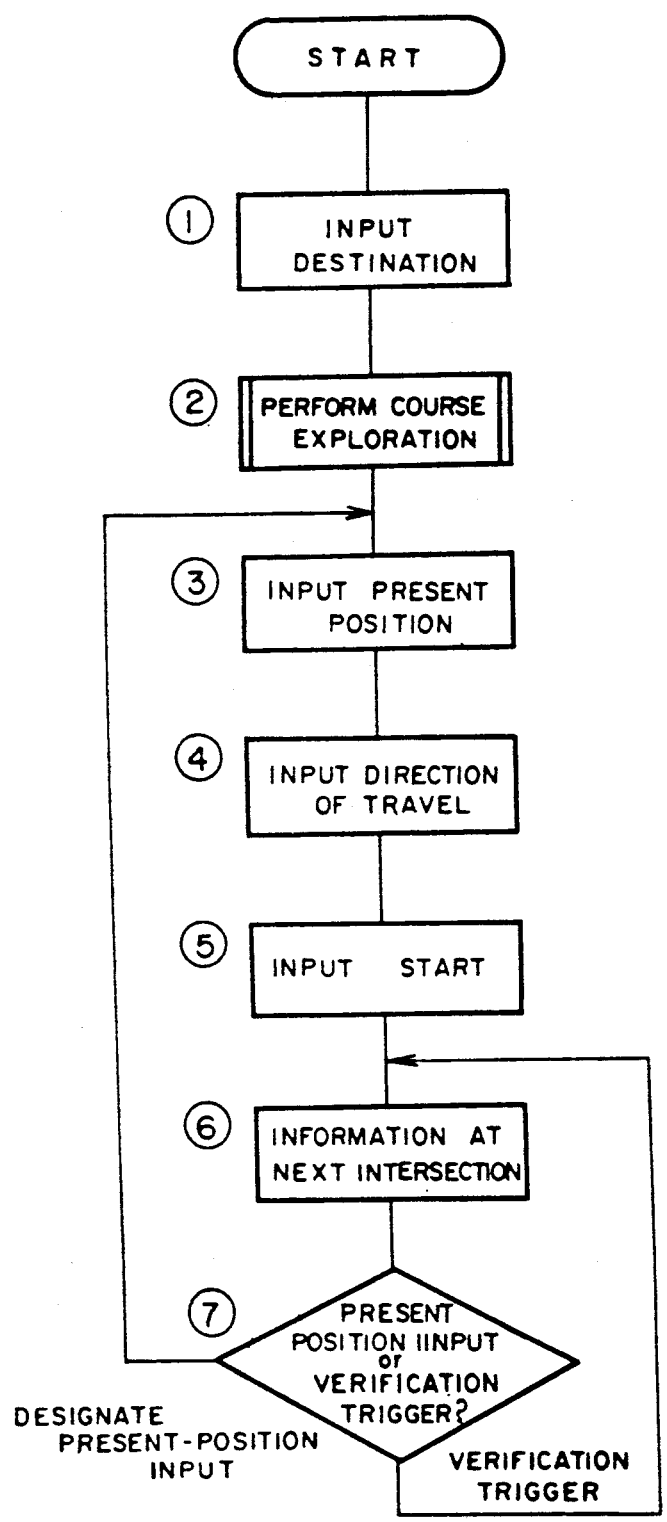
FIG. 34 is a view for describing the flow of navigation processing.

Reference will now be had to FIG. 34 to describe the flow of processing in a navigation apparatus having means for inputting destination and present location in code, an intersection verification trigger and a present-location input button, with guidance points being taken as intersections.

When the driver enters the code of a desired destination [step (1)], a course exploration mode is established in which information for travel to the desired destination is set for all geographical points with the exception of the entered desired destination [step (2)]. When course exploration ends, a present position input mode is established. Here the code of present position is entered [step (3)]. When this is done, the direction of forward travel from this position is outputted [step (4)]. Next, when the driver inputs an intersection verification trigger [a start input, step (5)], information for attaining the destination at the next intersection is outputted (step (6)]. Next, monitoring is performed [step (7)] to see whether the intersection verification trigger or a signal from the present-position input button has been entered. If the intersection verification trigger has been entered, the program returns to the processing of step (6). If the signal from the present-position input button has been entered, the program returns to the processing of step (3). In other words, in accordance with this system, a trigger is inputted each time an intersection is verified providing that the vehicle is travelling as per instructions. If the vehicle strays from the instructed course and the driver notices this only after the vehicle has travelled to another intersection, the present-position input button is pressed. Accordingly, whenever a trigger is inputted, guidance information relating to an intersection on a route leading to the desired destination is outputted in sequential fashion. When the present position input button is pressed, the present position input mode is established.

Figure 35A:
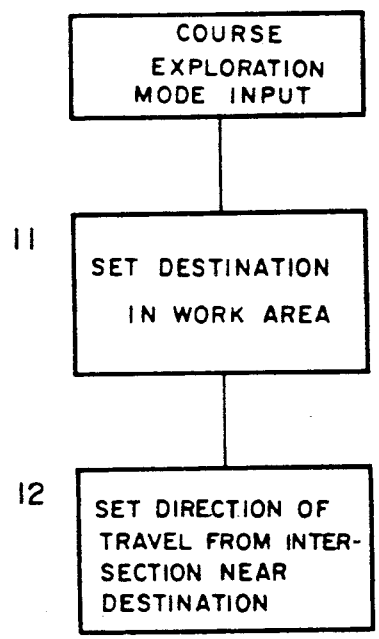
FIGS. 35(a)-35(b) views for describing course exploration processing.
Figure 35B:
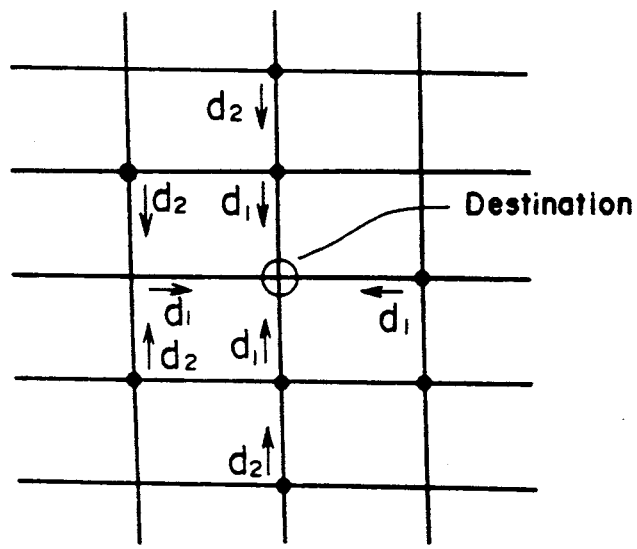

The course exploration processing of step (2) will now be described. When the course exploration input mode is established, as shown in FIG. 35(a), first the desired destination is set in a work area [step (11)], after which forward directions from intersections near the destination are set [step (12)]. As shown in FIG. 35(b), the set forward directions include forward directions $d_1$ at intersections before the destination, and forward directions $d_2$ at intersections before the first-mentioned intersections. It is permissible to execute this course exploration after the processing of step (3) in FIG. 34, in which case course exploration would be performed whenever present position is inputted. Furthermore, since guidance information is outputted in response to the trigger input in accordance with the route set as a result of course exploration, the pertinent intersections are limited in number. Accordingly, it will suffice to provide guidance information solely for the minimum number of intersections.

In the above example, intersections are as employed as guidance points. However, if there is a long distance between intersections, it is possible to set such landmarks as bridges, guard rails and public facilities as guidance points along the way. Also, characterizing absolute information at a geographical point may be used as information for travel to an intersection, a map or photograph can be outputted on the display screen, and a voice-track output can be provided. In such case, if the outputted information is for calling the driver's attention, it can be arranged so that the form of the display or the display attribute for this part of the information is changed or so that use is made of a different tone, an intermittent tone or the like.

For example, the navigation apparatus having the present-position calculating system described earlier and an updating system based on the above-described touch operation or the like can be combined, as when there is a region having a simple road network, such as only a single road, and a region having a complicated road network.

In accordance with the present invention as described above, all turning angles at an intersection are computed and are made to correspond to the turning angle of the vehicle. As a result, intersection detection and selection of the road in the direction of travel can be carried out in highly precise manner. In addition, an angle which depends upon travelling state at the time of a turn is detected, and so are turning-point position, turning starting point and end point on both sides of the turning point. As a result, accurate present-position calculation based on distance correction becomes possible, and correction of distance error can be performed for every intersection. Moreover, direction of travel to the destination is set for every intersection, and present position is recognized at each information, thereby providing guidance for the direction of travel. Accordingly, course to an intersection can be selected freely and guidance can be provided at any intersection in conformity with the selection made.

Further, intersection recognition processing is performed on the condition that a predetermined range has been penetrated from an end-point intersection based on road network data, a road in the travelling direction is recognized, and guidance to the next end-point intersection is outputted with the road in the travelling direction serving as a present-position road, whereby course guidance is performed repeatedly at every intersection up to the destination. As a result, a flexible response is possible from any intersection through data having a simple structure. Moreover, even if a road different from a course instructed through guidance is selected as the road in the direction of travel, guidance in a direction of travel leading to the destination will be outputted at the end-point intersection of the road selected. This means that even if an intersection is passed through without obeying an optimum course for reasons of a traffic tie-up or the like, guidance to the destination will be obtained. Similarly, even if the driver strays off course and becomes lost, it will suffice to continue travelling to an intersection and then input the intersection as the present position, whereby present-position pursuit processing can be executed immediately without performing course exploration. In addition, if means for identifying intersections can no longer be used, the driver can make a substitution for these means by inputting an intersection verification signal.

What is claimed is:

1. A navigation apparatus for a vehicle which, by being provided with an input of a desired destination, performs course exploration up to the destination to furnish a course to the destination while keeping track of present position of the vehicle, said apparatus comprising:
   storage means for storing road network data including road network information having intersections as reference points,
   means for detecting the steering angle of the vehicle,
   means for detecting the travel distance of the vehicle,
   computing means for computing the vehicle orientation and trajectory from said detected steering angle and said detected travel distance,
   turning-point detecting means for detecting a turning point from said detected steering angle and said computed vehicle orientation and computing the position of the turning point, and
   road selecting means for determining an actual vehicle turning angle from the turning-point position and comparing the actual vehicle turning angle with the turning angle of a road leading to an intersection obtained from the road network data, and selecting a road in a travelling direction which passes through the intersection based on the comparison,
   wherein said vehicle turning angle is determined based on three points, namely, the turning-point position, the turn starting point and the turn end points, and said present position is calculated based on the selected road in the travelling direction and intersection information.

2. A navigation apparatus according to claim 1, wherein said turning-point detecting means detects a turning point on the condition that said steering angle exceeds a threshold value and a predetermined rotational angle.

3. A navigation apparatus according to claim 1, wherein said road selecting means selects, as a road in the travelling direction, a connecting road for which a difference between said vehicle turning angle and a turning angle of the connecting road is minimum.

4. A navigation apparatus according to claim 3, wherein a said connecting road, for which said difference between said vehicle turning angle and said turning angle of the connecting road lies within a range of predetermined value, is selected as said road in the travelling direction.

5. A navigation apparatus according to claim 3, wherein said road selecting means determines information corresponding to three points, namely, the turning-point position, the turn starting point and the turn end points, in accordance with an intersection range distance on the condition that an intersection range is passed through without a turn being detected.

6. A navigation apparatus according to claim 1, which includes distance error correcting means for correcting the present position on a road in a travelling direction based on the detected turning-point position.

* * * * *

UNITED STATES PATENT AND TRADEMARK OFFICE
CERTIFICATE OF CORRECTION

PATENT NO. : 5,067,082
DATED : November 19, 1991
INVENTOR(S) : NIMURA et al

It is certified that error appears in the above-identified patent and that said Letters Patent is hereby corrected as shown below:

Col. 4, line 63, delete "and", first instance, insert --an--.

Col. 11, line 13, after "number", second instance, insert --(7)--;

line 14, delete ",is".

Col. 15, line 40, delete "25(b)" insert --26(b)--;

line 43, "-(20°)" should read -- -20° --;

line 47, "-(20°)" should read --(-20°)--.

line 53, after "entering" insert --intersection number IV, as shown in Fig. 27(a), are--.

Col. 16, line 8, delete "to", first instance;

line 21, in the table, under the heading "ROAD NO.", "4" should read --(4)--;

line 22, in the table, under the heading "ROAD NO.",

UNITED STATES PATENT AND TRADEMARK OFFICE
CERTIFICATE OF CORRECTION

PATENT NO. : 5,067,082
DATED : November 19, 1991
INVENTOR(S) : NIMURA et al

It is certified that error appears in the above-identified patent and that said Letters Patent is hereby corrected as shown below:

"5" should read --⑤--;

line 23, in the table, under the heading "ROAD NO.",

"8" should read --⑧--;

line 24, in the table, under the heading "ROAD NO.",

"9" should read --⑨--;

line 27, "⑩ ⑧" should read --⑩ —> ⑧--; and line 55, after "number" insert --of--.

UNITED STATES PATENT AND TRADEMARK OFFICE
CERTIFICATE OF CORRECTION

PATENT NO. : 5,067,082

DATED : November 19, 1991

INVENTOR(S) : NIMURA et al

It is certified that error appears in the above-indentified patent and that said Letters Patent is hereby corrected as shown below:

IN THE CLAIMS

Col. 20, line 61, delete "a".

Signed and Sealed this

Twenty-first Day of September, 1993

Attest:

BRUCE LEHMAN

Attesting Officer   Commissioner of Patents and Trademarks